(12) United States Patent
    Misaki et al.

(10) Patent No.: US 10,418,629 B2
(45) Date of Patent: Sep. 17, 2019

(54) COMPOSITE ACTIVE MATERIAL FOR LITHIUM ION SECONDARY BATTERIES AND METHOD FOR PRODUCING SAME

(71) Applicant: TOSOH CORPORATION, Shunan-shi, Yamaguchi (JP)

(72) Inventors: Hidehiko Misaki, Ayase (JP); Masanori Abe, Ayase (JP); Toru Tsuyoshi, Ayase (JP); Masanori Kohgo, Ayase (JP); Shuji Takato, Ayase (JP); Taichi Arakawa, Ayase (JP); Kohei Iwanaga, Ayase (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 132 days.

(21) Appl. No.: 15/126,040

(22) PCT Filed: Mar. 20, 2015

(86) PCT No.: PCT/JP2015/058623
    § 371 (c)(1),
    (2) Date: Sep. 14, 2016

(87) PCT Pub. No.: WO2015/146864
    PCT Pub. Date: Oct. 1, 2015

(65) Prior Publication Data
    US 2017/0084913 A1    Mar. 23, 2017

(30) Foreign Application Priority Data

Mar. 25, 2014  (JP) ................................ 2014-061376
May 7, 2014    (JP) ................................ 2014-096158
    (Continued)

(51) Int. Cl.
    *H01M 2/00*    (2006.01)
    *H01M 2/16*    (2006.01)
        (Continued)

(52) U.S. Cl.
    CPC ......... *H01M 4/386* (2013.01); *H01M 4/0471* (2013.01); *H01M 4/133* (2013.01);
        (Continued)

(58) Field of Classification Search
    CPC ........ H01M 4/38; H01M 4/386; H01M 4/133; H01M 4/134; H01M 4/04; H01M 4/0471;
        (Continued)

(56) References Cited

U.S. PATENT DOCUMENTS

2010/0273058 A1* 10/2010 Lee ...................... H01M 4/133
                                                    429/225
2012/0064409 A1*  3/2012 Zhamu .................. B82Y 30/00
                                                    429/221
2014/0227600 A1*  8/2014 Kachi ..................... H01M 4/38
                                                    429/231.4

FOREIGN PATENT DOCUMENTS

CN         1771617 A      5/2006
CN       101449410 A      6/2009
            (Continued)

OTHER PUBLICATIONS

International Search Report of PCT/JP2015/058623 dated Jun. 23, 2015.
    (Continued)

*Primary Examiner* — Karie O'Neill Apicella
(74) *Attorney, Agent, or Firm* — Sughrue Mion, PLLC

(57) ABSTRACT

Provided are: an anode active material for a lithium ion secondary battery with which high initial efficiency and battery capacity can be maintained and excellent cycling characteristics are achieved; and a method for producing such an active material. The anode active material for a lithium ion secondary battery, the active material comprising a Si compound and a carbonaceous material or a carbonaceous material and graphite, is obtained by a method comprising the steps of:
    (Continued)

mixing a Si compound, a carbon precursor, and, as appropriate, graphite powder;
performing granulation/compaction;
pulverizing the mixture to form composite particles;
firing the composite particles in an inert gas atmosphere; and
subjecting the pulverized and conglobated composite powder or the fired powder to air classification.

20 Claims, 5 Drawing Sheets

(30) Foreign Application Priority Data

Dec. 2, 2014 (JP) ................................ 2014-243869
Dec. 8, 2014 (JP) ................................ 2014-247751

(51) Int. Cl.
H01M 2/18 (2006.01)
H01M 4/38 (2006.01)
H01M 4/04 (2006.01)
H01M 4/1393 (2010.01)
H01M 4/1395 (2010.01)
H01M 4/36 (2006.01)
H01M 4/587 (2010.01)
H01M 4/133 (2010.01)
H01M 4/134 (2010.01)
H01M 10/0525 (2010.01)
H01M 4/02 (2006.01)
H01M 10/052 (2010.01)

(52) U.S. Cl.
CPC ......... *H01M 4/134* (2013.01); *H01M 4/1393* (2013.01); *H01M 4/1395* (2013.01); *H01M 4/364* (2013.01); *H01M 4/366* (2013.01); *H01M 4/587* (2013.01); *H01M 10/0525* (2013.01); *H01M 10/052* (2013.01); *H01M 2004/021* (2013.01); *H01M 2004/027* (2013.01)

(58) Field of Classification Search
CPC .... H01M 4/1393; H01M 4/1395; H01M 4/36; H01M 4/364; H01M 4/366; H01M 4/587; H01M 10/0525; H01M 2/00; H01M 2/16; H01M 2/18
See application file for complete search history.

(56) References Cited

FOREIGN PATENT DOCUMENTS

| JP | 10-289718 A | 10/1998 | |
| JP | 2008-27897 A | 2/2008 | |
| JP | 2009-181767 A | 8/2009 | |
| JP | 2012-124122 A | 6/2012 | |
| JP | 2013-196842 A | 9/2013 | |
| JP | 2015-26579 A | 2/2015 | |
| WO | 2013/027686 A1 | 2/2013 | |
| WO | WO-2013027686 A1 * | 2/2013 | .............. H01M 4/38 |
| WO | 2014/129594 A1 | 8/2014 | |
| WO | 2015/041063 A1 | 3/2015 | |

OTHER PUBLICATIONS

Jun Lai, et al., "Preparation and characterization of flake graphite/silicon/carbon spherical composite as anode materials for lithium-ion batteries", Journal of Alloys and Compounds, 2012, vol. 530, pp. 30-35.
Jong-Hyuk Lee, et al., "Spherical silicon/graphite/carbon composites as anode material for lithium-ion batteries", Journal of Power Sources, 2008, vol. 176, pp. 353-358.
Communication dated Aug. 11, 2017 from the European Patent Office in counterpart Application No. 15768506.6.
Communication dated May 18, 2018, from the Intellectual Property Office of Taiwan in counterpart application No. 104109462.
Communication dated Jun. 20, 2018, from the State Intellectual Property Office of People's Republic of China in counterpart Application No. 201580016235.2.
Communication drafted Feb. 22, 2019 from Japanese Patent Office in corresponding JP Application No. 2015-056646.
Communication dated Feb. 19, 2019 (per Global Dossier) from the State Intellectual Property Office of the P.R.C. in corresponding CN Application No. 201580016235.2.

* cited by examiner

COMPOSITE ACTIVE MATERIAL FOR LITHIUM ION SECONDARY BATTERIES AND METHOD FOR PRODUCING SAME

CROSS REFERENCE TO RELATED APPLICATIONS

This application is a National Stage of International Application No. PCT/JP2015/058623 filed Mar. 20, 2015, claiming priority based on Japanese Patent Application No. 2014-061376, filed Mar. 25, 2014, 2014-096158, filed May 7, 2014, 2014-243869, filed Dec. 2, 2014, and 2014-247751, filed Dec. 8, 2014, the contents of which are incorporated herein by reference in their entirety.

TECHNICAL FIELD

The present invention relates to an anode active material for lithium ion secondary batteries and a production method therefor.

BACKGROUND ART

There is an increasing demand for higher capacities for lithium ion secondary batteries, due to the performance improvement of mobile devices such as a smart phone, a tablet device and the like, and popularity of vehicles equipped with lithium ion secondary batteries such as EV, PHEV and the like. Currently, graphite is primarily used as an anode material in a lithium ion secondary battery. However, to achieve a higher capacity, an anode material that uses metals such as silicon or tin, or other elements, which have higher theoretical capacities and is capable of storing and releasing lithium ions is under active development.

On the other hand, such an active material which contains a metal material capable of storing and releasing lithium ions is known to exhibit a significant volume increase upon alloying with lithium by charging. Due to this volume increase, the active material breaks into finer pieces and an anode in which the material is used also breaks up in its structure resulting in the loss of conductivity. Therefore, the decrease in the capacity after many cycles is a problem for the anode using such a metal material.

To solve this problem, a method of making these metal materials into fine particles and making a composite of these fine particles and carbonaceous materials or graphite is proposed. In these composite particles, these metal materials create an alloy with lithium, resulting in retention of conductivity due to carbonaceous materials or graphite even when the active material breaks into finer pieces. Thus, these composite particles are known to exhibit significant improvement of cycle characteristic compared to the material in which such a material is used alone as an anode material. For example, Patent Document 1 discloses an anode active material including a fine particle on which a carbonaceous material is formed, and said fine particle contains at least one kind of element selected from the group consisting of Mg, Al, Si, Ca, Sn and Pb, has an average particle size of 1 to 500 nm and an atomic ratio of the fine particle in the active material is not lower than 15 wt %.

Patent Document 2 discloses a metal-carbon composite particle, in which a metal particle is buried in a plurality of phases of carbon that contains graphite and amorphous carbon. It is described that the metal particle is composed of any one of Mg, Al, Si, Zn, Ge, Bi, In, Pd, or Pt, and the average particle size of the metal particles is preferably 0.1 to 20 µm. Patent Document 3 discloses an anode active material that has a so-called core-shell structure, which includes graphite core particles and carbon layer (shell) covering said graphite core particle and metal particles disposed in said carbon layer as dispersed inside said carbon layer. Preferably, the average particle size of the graphite core particles is 1 to 20 µm, the coating thickness of the carbon layer is 1 to 4 µm, metal that alloys with the lithium contains at least one material selected from the group consisting of Cr, Sn, Si, Al, Mn, Ni, Zn, Co, In, Cd, Bi, Pb, and V and the average particle size thereof is 0.01 to 1.0 µm.

Furthermore, Patent Document 4 describes a method of manufacturing a composite active material for a lithium secondary battery, which includes the steps of mixing and of conglobation: in the step of mixing, expanded graphite or flake graphite with a BET specific surface area of 30 m²/g or greater and a battery active material capable of compounding with lithium ions are mixed to obtain a mixture; in the step of conglobation, the conglobation treatment is applied to said mixture to manufacture a substantially spherical composite material for a lithium secondary battery including a battery active material capable of compounding with graphite and lithium ions. The battery active material capable of compounding with lithium ions preferably contains at least one type of elements selected from the group consisting of Si, Sn, Al, Sb, and In, and the average particle size thereof is preferably not greater than 1 µm.

The use of these fine metal materials can reduce the expansion per particle caused by insertion of lithium during charging and reduce breakage of the material, thus improving the cycle life. However, the performance does not satisfy the requirement yet, and further improvement of the cycle life is needed.

In the method described above, in which the composite particles are used, the denser the composite particles fills an anode thin film, the higher the energy density of the anode, thereby improving the battery performance. Also, by packing the composite particles uniformly and as isotropic as possible, lithium enters and exits more uniformly and topical degradation of the anode can be avoided, resulting in the improved cycle life. For example, Patent Document 5 discloses an anode material for a lithium secondary battery, including a spherical graphite particle originating in a scaly natural graphite particle, and the circularity thereof is preferably not less than 0.85.

CITATION LIST

Patent Literature

Patent Document 1: Japanese Unexamined Patent Application Publication No. H10-3920A
Patent Document 2: Japanese Unexamined Patent Application Publication No. 2000-272911A
Patent Document 3: Japanese Unexamined Patent Application Publication No. 2010-129545A
Patent Document 4: Japanese Patent No. 5227483B
Patent Document 5: Japanese Unexamined Patent Application Publication No. 2012-221951A

SUMMARY OF INVENTION

Technical Problem

The present invention relates to an anode active material for a lithium ion secondary battery, which contains and makes a composite of Si or a Si alloy (collectively referred to as a "Si compound" hereafter) and a carbonaceous material or a carbonaceous material and graphite and provides an anode active material which yields a lithium ion secondary battery with an excellent energy density and cycle life or a large discharge capacity and a long cycle life and the production method thereof.

Solution to Problem

The present inventors have studied diligently to solve the problems described above and discovered:

For an anode active material for a lithium ion secondary battery including a Si compound, a carbonaceous material or a carbonaceous material and graphite, an anode active material (active material A) which gives a lithium ion secondary battery having a high energy density and a long cycle life can be obtained by controlling a particle size and a particle shape of said composite material, and an anode active material (active material B) that is a substantially spherical material with an average circularity of 0.7 to 1.0, which gives a lithium ion secondary battery having a greater discharge capacity and a long cycle life can be obtained by using an anode active material for a lithium ion secondary battery which contains 10 to 80 wt % of a Si compound having an average particle size (D50) of 0.01 to 0.6 μm, D90 of 0.01 to 1.0 μm, and a BET specific surface area measured by the BET method of 40 to 300 m²/g and 90 to 5 wt % of the carbonaceous material and 0 to 80 wt % of graphite.

Namely, the present invention has the following aspects.

1. An anode active material for a lithium ion secondary battery including:
Si or a Si alloy; and
a carbonaceous material or a carbonaceous material and graphite;
the anode active material being a substantially spherical composite particle, having an average particle size (D50) of 1 to 40 μm, and an average circularity of 0.7 to 1.0.

2. The anode active material for a lithium ion secondary battery according to 1 above, wherein the average particle size (D50) of the anode active material is 1 to 10 μm, and the anode active material is a composite particle including a plate-like fine particles with a minor axis length shorter than 1 μm measured by SEM image observation in not less than 1 wt % and not greater than 80 wt %.

3. The anode active material for a lithium ion secondary battery according to 1 or 2 above, wherein an average particle size (D50) of the Si or the Si alloy is 0.01 to 5 μm and a carbonaceous material covers at least an active material surface.

4. The anode active material for a lithium ion secondary battery according to 1 or 2 above, wherein an average particle size (D50) of the Si or the Si alloy is 0.01 to 1 μm and a carbonaceous material covers at least an active material surface.

5. The anode active material for a lithium ion secondary battery according to any one of 1 to 4 above, wherein the anode active material has a structure in which the Si or the Si alloy together with the carbonaceous material is interposed between thin layers of graphite having a thickness of 0.2 μm or less, the structure spreads in layers and/or in mesh-like patterns, the thin layers of graphite are curled near a surface of an active material particle to cover the active material particle and a carbonaceous material covers an outermost surface of the active material particle.

6. The anode active material for a lithium ion secondary battery according to any one of 1 to 5 above, wherein:
a purity of the graphite determined by a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) using ICP atomic emission spectroscopy is 99.9 wt % or higher, or an amount of impurities is 1000 ppm or less;
an S content determined by ion chromatography (IC) analysis with Oxygen-flask Method is 0.3 wt % or less; and/or
a BET specific surface area is 40 m²/g or smaller.

7. The anode active material for a lithium ion secondary battery according to any one of 1 to 6 above, wherein an amount of the Si or the Si alloy is 10 to 80 wt % and an amount of the carbonaceous material is 90 to 20 wt %.

8. The anode active material for a lithium ion secondary battery according to any one of 1 to 6 above, wherein an amount of the Si or the Si alloy is 10 to 60 wt %, an amount of the carbonaceous material is 5 to 40 wt %, and an amount of the graphite is 20 to 80 wt %.

9. The anode active material for a lithium ion secondary battery according to any one of 1 to 8 above, wherein a BET specific surface area is 0.5 to 80 m²/g.

10. A production method for the anode active material for a lithium ion secondary battery described in any one of 1 to 9 above, the method comprising the steps of:
mixing Si or a Si alloy, a carbon precursor and graphite;
performing granulation/compaction;
performing pulverization and conglobation treatment to form a substantially spherical composite particle; and
firing the composite particle in an inert gas atmosphere.

11. The production method for an anode active material for a lithium ion secondary battery according to 10 above, wherein a pulverized particle is re-bonded to form the substantially spherical composite particle in the conglobation treatment.

12. A production method for the anode active material for a lithium ion secondary battery described in any one of 1 to 9 above, the method comprising the steps of:
mixing Si or a Si alloy, a carbon precursor and graphite;
performing granulation/compaction;
performing pulverization and conglobation treatments to form a substantially spherical composite particle;
firing the composite particle in an inert gas atmosphere; and
air-classifying a particle treated by pulverization and conglobation treatment or a fired particle.

13. The production method for an anode active material for a lithium ion secondary battery according to 12 above, wherein a pulverized particle is re-bonded to form the substantially spherical composite particle and a plate-like fine particle or the substantially spherical composite particle and a plate-like fine particle are mixed, agitated and classified in the conglobation treatment.

14. The production method for an anode active material for a lithium ion secondary battery according to any one of 10 to 13 above, wherein the carbon precursor is a carbonaceous compound having a weight average molecular weight (Mw) of 1000 or less.

15. The production method for an anode active material for a lithium ion secondary battery according to any one of 10 to 14 above, wherein the graphite is expanded graphite or flake graphite.

16. The production method for an anode active material for a lithium ion secondary battery according to any one of 10 to 15 above, wherein a temperature of firing the composite particle in an inert gas atmosphere is 600 to 1200° C.

17. An anode active material for a lithium ion secondary battery including:

10 to 80 wt % of Si or a Si alloy having an average particle size (D50) of 0.01 to 0.6 μm, D90 of 0.01 to 1.0 μm, and a BET specific surface area determined by BET method of 40 to 300 m$^2$/g;

90 to 5 wt % of a carbonaceous material; and 0 to 80 wt % of graphite; and the anode active material being substantially spherical with an average circularity of 0.7 to 1.0.

18. The anode active material for a lithium ion secondary battery according to 17 above, wherein:

the Si or the Si alloy has an average particle size (D50) of 0.01 to 0.3 μm, D90 of 0.01 to 0.5 μm, and a BET specific surface area determined by BET method of 70 to 300 m$^2$/g.

19. The anode active material for a lithium ion secondary battery according to 17 or 18 above, wherein:

the anode active material has an average particle size (D50) of 1 to 40 μm, and a BET specific surface area determined by BET method of 5 to 120 m$^2$/g, and a surface of the anode active material is covered by an carbonaceous material.

20. The anode active material for a lithium ion secondary battery according to any one of 17 to 19 above, wherein:

a purity of the graphite determined by a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) using ICP atomic emission spectroscopy is 99.9 wt % or higher, or an amount of impurities is 1000 ppm or less;

an S content determined by ion chromatography (IC) analysis with Oxygen-flask Method is 0.3 wt % or less; and/or a BET specific surface area is 40 m$^2$/g or smaller.

21. The anode active material for a lithium ion secondary battery according to any one of 17 to 20 above, wherein the anode active material has a structure in which the Si or the Si alloy together with the carbonaceous material is interposed between thin layers of graphite having a thickness of 0.2 μm or thinner, the structure spreads in layers and/or in mesh-like patterns, the thin layers of graphite are curled near a surface of an active material particle to cover the active material particle and a carbonaceous material covers an outermost surface of the active material particle.

22. A production method for the anode active material for a lithium ion secondary battery described in any one of 17 to 21 above, the method including the steps of:

mixing Si or a Si alloy having an average particle size (D50) of 0.01 to 0.6 μm, D90 of 0.01 to 1.0 μm, and a BET specific surface area of 40 to 300 m$^2$/g determined by BET method, and a carbon precursor, and furthermore graphite as appropriate;

performing granulation/compaction;

performing pulverization and conglobation treatments to form a substantially spherical composite particle; and firing the composite particle in an inert gas atmosphere.

23. The production method for an anode active material for a lithium ion secondary battery according to 22 above, wherein a temperature of firing the composite particle in an inert gas atmosphere is 600 to 1000° C.

Advantageous Effects of Invention

According to the present invention, an anode active material suitable for forming an anode having a high energy density and excellent cycle characteristics can be obtained by forming a composite particle into a substantially spherical particle having a high bulk density. Also, by reducing an expansion volume per particle due to a silicon fine particle and making a composite of the carbonaceous materials, a reaction between an electrolyte and silicon can be suppressed, thus excellent cycle characteristics and a high initial efficiency can be obtained.

Also, according to the present invention, by reducing an expansion volume per particle due to a silicon with an average particle size (D50) of 0.01 to 0.6 μm, D90 of 0.01 to 1.0 μm and a BET specific surface area determined by the BET method of 40 to 300 m$^2$/g, a reaction between an electrolyte and silicon can be suppressed, thus excellent cycle characteristics and a high initial efficiency can be obtained. In addition, the production method of the present invention can provide an anode active material with a high bulk density suitable for forming a high density anode.

Figure 1:
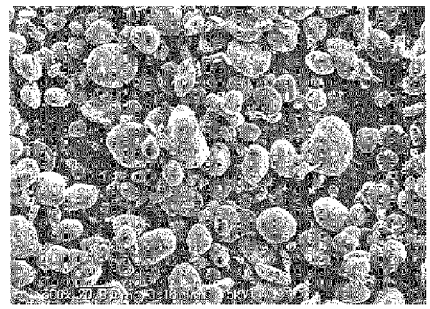
FIG. 1 is a secondary electron image by SEM of particles of an anode active material obtained in Working Example 1.

First, the active material A of the present invention is described in detail.

The active material A is an anode active material for a lithium ion secondary battery including Si or a Si alloy; a carbonaceous material or a carbonaceous material and graphite; the anode active material being a substantially spherical composite particle, and having an average particle size (D50) of 1 to 40 μm, and an average circularity of 0.7 to 1.0.

The Si in the active material A is not particularly limited as long as the purity thereof is that of a metallic silicon of general purpose grade or higher, and includes: a metallic silicon of general purpose grade (a purity of approximately 98 wt %), a metallic silicon of chemical grade (a purity of 2 to 4 N), a polysilicon that is chlorinated and distilled by evaporation (a purity of 4 N or higher), a monocrystalline silicon via deposition process by a monocrystalline growth method (ultrahigh purity), or a p-type or n-type material that is obtained by doping an element from the group 13 or 15 of the periodic table into such a metallic silicon, disposals from polishing or cutting a wafer generated in the manufacturing process of a semiconductor, a disposed wafer rated defective in the process and the like.

A Si alloy for the active material A is an alloy that contains Si as a major component. An element other than Si contained in the Si alloy is preferably one or more elements from the group 2 to 15 in the periodic table. And it is preferable that selection and/or the added amount of the element raises the melting point of a phase contained in the alloy to equal to or above 900° C.

An average particle size (D50) of the Si compound for the active material A is preferably 0.01 to 5 μm, more preferably 0.01 to 1 μm and particularly preferably 0.05 to 0.6 μm. If the average particle size (D50) is smaller than 0.01 μm, the decrease in the capacity and the initial efficiency due to the surface oxidation will be significant. If the average particle size (D50) is greater than 5 μm, cracks due to the expansion caused by lithium insertion will occur and the cycle life may degrade rapidly. The average particle size (D50) is a volumetric average particle size measured by a laser particle size distribution analyzer.

The content of the Si compound is preferably 10 to 80 wt % and particularly preferably 15 to 50 wt %. If the content of the Si compound is less than 10 wt %, a sufficiently large capacity is not obtained compared to the conventional graphite. If the content is greater than 80 wt %, the cycle life may degrade rapidly.

A carbonaceous material in the active material A is an amorphous or fine crystalline carbonaceous material, and includes a graphitizable carbon (soft carbon) which is graphitized by a thermal treatment at a temperature over 2000° C. and a non-graphitizable carbon (hard carbon) which is hard to be graphitized.

If the active material A contains a carbonaceous material, the content of the carbonaceous material is preferably 90 to 20 wt % and particularly preferably 40 to 20 wt %. If the content of the carbonaceous material is less than 20 wt %, the carbonaceous material fails to cover the whole Si compound, causing conductive paths to be incomplete, resulting in a significant capacity degradation. If the content of the carbonaceous material is greater than 90 wt %, a sufficiently large capacity is not obtained.

The graphite in the active material A is a crystalline, in which graphene layers are parallel to the c-axis, and includes a natural graphite purified from an ore, a synthetic graphite that is obtained by graphitizing petroleum or coal pitch and the like. The forms of the raw materials include scaly, pellet-shape or spherical, cylindrical or fiber-form, and the like. In addition, an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like may be used. The particle size of the graphite contained in the active material A of the present invention is not particularly limited as long as it is smaller than the size of the anode active material particles. The thickness of the graphite particle is preferably not greater than ⅕ of the average particle size (D50) of the active material. Addition of graphite increases the conductivity and the strength of the active material particles and improves the rate characteristics of the charge-discharge process and cycle characteristics. d002, a layer spacing for the (002) layers, determined by X-ray diffraction of the graphite particles is preferably 0.338 nm or less. Such d002 values indicate that the graphite is highly graphitized. If the value of d002 is greater than this value, the effectiveness of conductivity improvement by the graphite is diminished.

Preferably, the graphite in the active material A has a purity of 99.9 wt % or higher, or the impurity amount of 1000 ppm or less, the S content of 0.3 wt % or less and/or a BET specific surface area of 40 m$^2$/g or smaller. If the purity is lower than 99.9 wt % or the impurity amount is greater than 1000 ppm, irreversible capacity due to the formation of SEI originated from the impurities becomes large. Thus, the initial charge-discharge efficiency, which is the discharge capacity relative to the charged capacity for the first time, shows a tendency to be small. Also, if the S content is greater than 0.3 wt %, similarly the increase in the irreversible capacity leads to the decrease in the initial charge-discharge efficiency. More preferably, the S content is 0.1 wt % or less. If the BET specific surface area of the graphite is greater than 40 m$^2$/g, the area for the reaction with the electrolyte increases, and the initial charge-discharge efficiency may decrease.

For impurities, a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) is measured by the ICP atomic emission spectroscopy. Meanwhile, the S content is measured by combustion-adsorption treatment of the Oxygen-flask Method, followed by filtering and Ion chromatography (IC).

If the active material A contains a carbonaceous material and graphite, the content of the carbonaceous material is preferably 5 to 40 wt % and particularly preferably 8 to 30 wt %, and the content of the graphite is 20 to 80 wt % and particularly preferably 40 to 70 wt %. If the content of the carbonaceous material is less than 5 wt %, the carbonaceous material fails to cover whole Si compound and the graphite, leading to insufficient bonding between the Si compound and the graphite. Thus, the formation of the active material particles is likely to have difficulties. Alternately, if the content of the carbonaceous material is greater than 40 wt %, the effectiveness of the graphite, which has a higher conductivity than the carbonaceous material, may not be effectively employed. On the other hand, if the content of the graphite is less than 20 wt %, the effectiveness of the graphite, the conductivity of which is higher than that of the carbonaceous material is not exhibited sufficiently, and if the content is greater than 80 wt %, the capacity sufficiently large enough compared to the conventional graphite is not obtained.

The active material A is a substantially spherical composite particle and the average particle size (D50) thereof is 1 to 40 μm, preferably 2 to 30 μm and particularly preferably 2 to 20 μm. If the average particle size (D50) is smaller than 1 μm, resulting higher bulk density makes the preparation of a high-density electrode challenging. If the average particle size (D50) is over 40 μm, the surface of the electrode prepared by coating the electrode with the material is likely to have pronounced convexities and concaves, hampering the preparation of a uniform electrode. In addition, the average particle size of the Si compound is preferably not greater than ⅕ of the average particle size of said anode active material, and the carbonaceous material preferably covers at least the surface of the active material.

The substantially spherical composite particles include particles that have round-off corners due to the pulverization and the like of the obtained particles, particles of spherical or spheroid shape, particles of circular plate or pellet shape having a certain thickness with round-off corners, or particles of deformed shapes thereof with round-off corners and the like. The circularity of the particles is 0.7 to 1.0. The circularity is determined by image analysis of an image of particles obtained by Scanning Electron Microscopy. Namely, the projected area (A) and the perimeter (PM) of a particle is measured from a photograph and the area (B) of a perfect circle with the same perimeter (PM) is determined, then the circularity is defined as A/B. When the radius of the perfect circle is r, the equations $PM=2\pi r$ and $B=\pi r^2$ are given, thus the circularity can be calculated by the equation $A/B=A\times 4\pi/(PM)^2$. Using this equation, the average circularity is obtained by calculating an average of the circularities of the substantially spherical particles among 100 or more arbitrarily chosen composite particles, except the particles with their minor axes length shorter than 1 µm. The plate-like fine particles include particles that have round-off corners due to the pulverization and the like of the obtained particles, particles of circular plate or pellet shape having a certain thickness with round-off corners, or particles of deformed shapes thereof with round-off corners and the like. The minor axis length of the particle obtained from the image of the particle by Scanning Electron Microscopy is shorter than 1 µm. The content of the plate-like fine particles is defined as a value of the projected area of the plate-like fine particles divided by the projected area of all the particles. The rounder shape of the composite particles increases the bulk density of the composite particles, thereby increasing the packing density when they are made into an anode. Also, because the carbonaceous material covers at least the surface of the active material, lithium ions dissolved in the electrolyte dissociate from solvent on the surface of the carbonaceous material in the course of the charge-discharge, and only the lithium ions react with the Si compound and/or the graphite. Thus, the degradation products of the solvent is prevented and the efficiency of the charge-discharge is improved.

If the average circularity of the substantially spherical composite particles decreases, the bulk density decreases and the packing density of the anode formed from the composite particles also decreases. Also a number of contact points and contact areas among the composite particles also decrease, thus the probability of instances of electrical conductivity loss increases due to the volume expansion/contraction of the composite particles during charge-discharge, and the maintenance rate of the cycle capacity are likely to decrease. If substantially spherical particles and plate-like fine particles constitute the composite particles, the spacings between the substantially spherical particles are filled with the plate-like fine particles along with an increase in the content of the plate-like fine particle, thus the electrical conductivity may be maintained even under the volume expansion/contraction during the charge-discharge. If the average particle size (D50) is 1 to 10 µm and the content of the plate-like fine particles with the minor axis length shorter than 1 µm measured by SEM observation is 1 to 80 wt %, said anode active material exhibits the excellent maintenance rate of the cycle capacity. If the content of the plate-like fine particles is less than 1 wt % and/or the circularity of the substantially spherical particles is less than 0.7, the improvement on maintenance rate of the cycle capacity may not be observed.

Preferably, the active material A has a structure in which the Si compound together with a carbonaceous material is interposed between thin layers of graphite having a thickness of 0.2 µm or less, the structure spreads in layers and/or in mesh-like patterns, the thin layers of graphite are curled near the surface of an active material particle to cover the active material particle and a carbonaceous material covers an outermost surface of the active material particle.

The thin layers of graphite in the active material A are thin layers of graphite including an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like, or one layer (thickness: 0.0003 µm) to several hundreds of layers (thickness: ca. 0.2 µm) of graphene produced by subjecting the graphenes above to compression force. The less the thickness of the thin layers of graphite, the better the conductivity of electrons to the Si compound because the layer of the Si compound interposed between the thin layers of graphene and the carbonaceous material becomes thin. The thickness greater than 0.2 µm reduces the effect of the electron conduction to the thin layers of graphite. If a thin layer of graphite is observed as line-shaped in the cross-section, the length thereof is preferably not shorter than the half of the anode active material particle size for the electron conduction, and more preferably approximately similar to the anode active material particle size. If a thin layer of graphite is mesh-like patterns, the patterns is preferably continuous over the length not shorter than the half of the anode active material particle size for the electron conduction, and more preferably continuous over the length approximately similar to the anode active material particle size.

In the active material A, a thin layer of graphite is preferably curled near the surface of an active material particle to cover the active material particle. Such a shape reduces a risk where an electrolyte enters from the end face of the thin layers of graphite to directly contact the Si compound or the end face of the thin layer of graphite, thus the efficiency is compromised due to the reaction product formation during the charge-discharge.

Preferably, the content of the Si compound is 10 to 80 wt % and the content of the carbonaceous material is 90 to 20 wt %, in the active material A.

Preferably, the content of the Si compound is 10 to 60 wt %, the content of the carbonaceous material is 5 to 40 wt %, and the content of the graphite is 20 to 80 wt %, in the active material A.

The BET specific surface area of the active material A of the present invention is preferably 0.5 to 80 m$^2$/g.

The carbonaceous material is obtained by formation of a carbonaceous material by the carbonization of a carbon precursor described below inside the anode active material in the active material A of the present invention. Therefore, the active material A possesses a structure which prevents lithium ions dissolved in the electrolyte in the course of charge-discharge from directly contacting the Si compound and/or the graphite. The reaction of the carbonaceous material and the electrolyte on the surface is suppressed because of the BET specific surface area of 0.5 to 60 m$^2$/g. Thus the efficiency of the charge-discharge is improved.

Next, the production method of the active material A of the present invention will be described.

A production method for the active material A of the present invention includes the steps of:

mixing a Si compound, a carbon precursor and, as appropriate, graphite;

performing granulation/compaction;

performing pulverization to form a composite particle; and firing the composite particle in an inert gas atmosphere.

For the Si compound that is a raw material, the powder with an average particle size (D50) of 0.01 to 5 μm is preferably used. To obtain the Si compound with a predetermined particle size, the raw material (in a form such as an ingot, a wafer or powders) of the Si compound described above is pulverized by a pulverizer. In some cases, a classifier is used. For lumps such as an ingot or a wafer, a coarse crusher such as a jaw crusher may be used as a first step to pulverize the material. This may be followed by finer pulverization using, for example, a ball mill (to pulverize materials to be pulverized by impact force, friction force, or compression force induced by kinetic energy, which is obtained by the motion of pulverizing media such as balls and beads), a media mixing mill, a roller mill (to pulverize materials to be pulverized using the compression force of a roller), a jet mill (to pulverize materials to be pulverized using impact force caused by crushing them to the inner liner material in the high velocity or crushing particles each other), a hammer mill, a pin mill, a disk mill (to pulverize materials to be pulverized using impact force induced by the rotation of a rotor with a fixed hammer, a fixed blade, a fixed pin or the like), a colloid mill (to pulverize materials to be pulverized using shear force), a high-pressure wet collision disperser with a mutually facing configuration ("Ultimizer") and the like.

The pulverization may be either wet-type or dry-type. For further pulverization, for example, a wet-type beads mill may be used, while the size of the beads is reduced gradually, to obtain very fine particles. Also, to adjust the particle size distribution after pulverization, dry classification, wet classification or sifting classification may be used. The dry classification mainly utilizes air flow: the processes of dispersion, separation (separating fine particles from coarse particles), collection (separating solids from gas), and exhaust are performed sequentially or simultaneously. The pretreatment (adjusting water content, dispersion characteristics, humidity and the like) prior to the classification or adjustment of water content and oxygen content in the air flow used may be performed in order to prevent the reduction in classification efficiency due to interparticulate interference, particle shapes, turbulent air flow, velocity distribution, electrostatic effects and the like. In the system in which a dry classifier is integrated into a pulverizer, pulverization and classification can be performed without interruption, resulting in a desired particle size distribution.

Other methods to obtain Si compound with a predetermined particle size include a method in which the Si compound is heated and vaporized by plasma, laser or the like and solidified in an inert gas, and a method of CVD, plasma CVD or the like using gaseous raw materials. These methods are suitable for obtaining ultra fine particles with a size 0.1 μm or smaller.

A carbon precursor that is a raw material is not particularly limited as long as it is a carbonaceous compound with carbon as a major component, and can be converted to a carbonaceous material by the thermal treatment in an inert gas atmosphere. Examples thereof include petroleum-based pitch, coal-based pitch, synthetic pitch, tars, cellulose, sucrose, polyvinyl chloride, polyvinyl alcohols, phenol resin, furan resin, furfuryl alcohol, polystyrene, epoxy resin, polyacrylonitrile, melamine resin, acrylic resin, polyamide imide resin, polyamide resin, polyimide resin, and the like. Furthermore, a carbon precursor with strong bonding energy is preferable because it can form a substantially spherical particle by re-bonding pulverized particles during the step of forming composite particles described later. Particularly, the carbon precursor is preferably a carbonaceous compound, the weight average molecular weight (Mw) of which is not greater than 1000, because it will exhibit a strong bonding.

For graphite that is a raw material, a natural graphite, a synthetic graphite that is obtained by graphitizing petroleum or coal pitch and the like can be used. The forms thereof include scaly, pellet-shape or spherical, cylindrical or fiber-form, and the like. In addition, an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like may be used. Expanded graphite or pulverized expanded graphite exhibits excellent flexibility compared to other graphite, and it can easily form a substantially spherical composite particle by re-bonding pulverized particles during the step of forming composite particles described later. From the viewpoints above, the expanded graphite or the pulverized expanded graphite is preferably used. The graphite raw material is adjusted in its size for use in the mixing step in advance. The particle size before mixing is 1 to 100 μm for the natural graphite and synthetic graphite, and 5 μm to 5 mm for the expanded graphite, pulverized expanded graphite and graphene.

These Si compound, carbon precursor and, as appropriate, graphite can be mixed by kneading the Si compound, carbon precursor and, as appropriate, graphite under heat, if the carbon precursor softens or liquefies by heat. If the carbon precursor can be dissolved in a solvent, the Si compound, the carbon precursor, and graphite as appropriate, are blended in the solvent. The Si compound, the carbon precursor and the graphite as appropriate are dispersed and mixed in a solution in which the carbon precursor is dissolved, then the solvent may be removed subsequently. The solvent used is not particularly limited, as long as it can dissolve the carbon precursor. In case that pitches or tars are used as a carbon precursor, examples of the solvent include quinoline, pyridine, toluene, benzene, tetrahydrofuran, creosote oil, and the like. In case that polyvinyl chloride is used as a carbon precursor, examples of the solvent include tetrahydrofuran, cyclohexanone, nitrobenzene, and the like, and in case that phenol resin or furan resin is used as a carbon precursor, examples of the solvents include ethanol, methanol and the like.

As a method of mixing, a kneader can be used in case that the carbon precursor is heated and softened. In case that a solvent is used, in addition to the kneader above, a Nauta mixer, a Lödige mixer, a Henschel mixer, a high-speed mixer, a homo-mixer, and the like may be used. Also, the solvent is removed by jacket heating on the apparatus, followed by a vibrating dryer, a paddle dryer or the like.

A mixture of the Si compound, the carbon precursor and graphite as appropriate is granulated and compacted by solidifying the carbon precursor or agitating the mixture for a substantial amount of time during the removal of the solvent in the apparatus. Alternately, a mixture in which the carbon precursor has been solidified or the solvent has been removed may be granulated and compacted by compressing the mixture by a compressor such as a roller compactor, then pulverizing to coarse pieces by a pulverizer. Sizes of these materials after granulation/compaction are preferably 0.1 to 5 mm from the viewpoint of easy handling of the materials in the later pulverizing step.

Preferable methods of pulverizing the materials after granulation/compaction are dry pulverizing methods such as a ball mill (to pulverize materials to be pulverized by compression force), a media mixing mill, a roller mill (to pulverize materials to be pulverized using the compression force of a roller), a jet mill (to pulverize materials to be pulverized using impact force caused by crushing them to the inner liner material in the high velocity or crushing particles each other), a hammer mill, a pin mill, a disk mill (to pulverize materials to be pulverized using impact force induced by the rotation of a rotor with a fixed hammer, a fixed blade, a fixed pin or the like). To adjust the particle size distribution after the pulverization, dry classification such as air classification or sifting classification can be used. In the system in which a classifier is integrated into a pulverizer, pulverization and classification can be performed without interruption, resulting in a desired particle size distribution.

The composite particles obtained by pulverizing are fired in an inert atmosphere, such as in argon gas or nitrogen gas flow, or in vacuum. The firing temperature is preferably 600 to 1200° C. If the firing temperature is lower than 600° C., the irreversible capacity of amorphous carbon originating from the carbon precursor is large and the cycle characteristics are poor, thus the battery characteristics are likely to be poor. If the firing temperature is higher than 1200° C., there is an increase in possibility for reactions between the Si compound and the amorphous carbon originating from the carbon precursor or graphite, thus the discharge capacity is likely to decrease.

A production method for the active material A of the present invention preferably includes the steps of:

mixing and dispersing Si, a carbon precursor and, as appropriate, graphite in the solvent in which said carbon precursor is dissolved;

performing granulation/compaction;

performing pulverization and conglobation treatment to form a composite particle having a round shape; and firing said composite particle in an inert gas atmosphere.

Methods for pulverizing the material after granulation/compaction and applying conglobation treatment include: a method in which, after pulverizing the material according to the method described above and adjusting the particle size, the material is passed through a dedicated conglobation apparatus; and a method in which pulverization of the materials to be pulverized using the impact force induced by the rotation of a jet mill or a rotor is repeated or the duration for the treatment is extended. Examples of the dedicated conglobation apparatus include Faculty®, Nobilta®, and Mechano Fusion® available from Hosokawa Micron Group, COMPOSI available from Nippon Coke and Engineering Co., Ltd., Hybridization System available from Nara Machinery Co., Ltd., Kryptron Orb and Kryptron Eddy available from Earth Technica Co., Ltd. and the like.

A production method for the active material A of the present invention preferably includes the steps of:

mixing and dispersing a Si compound, a carbon precursor and expanded graphite or flake graphite in the solvent in which said carbon precursor is dissolved;

performing granulation/compaction;

performing pulverization and conglobation treatment to form a substantially spherical composite particle; and firing said composite particle in an inert gas atmosphere.

For the expanded graphite and flake graphite, acid-treated graphite which is natural or synthetic graphite subjected to acid treatment and oxidation treatment, is used as a raw material. An expanded graphite is obtained by subjecting an acid-treated graphite to thermal treatment, thereby expanding the graphite to delaminate a part between layers of graphite resulting in an accordion-shape. A flake graphite is a pulverized material of the expanded graphite or a graphene, the layers of which are delaminated therebetween by ultrasonic treatment and the like. The expanded graphite can be expanded to a greater extent by performing the acid treatment sufficiently and increasing the temperature gradient of the thermal treatment. Thus the thickness of the graphite thin layers of the obtained anode active material can be made thin by performing the mixing and dispersion sufficiently, resulting in the excellent electrical conductivity and cycle characteristics.

The active material A of the present invention obtained as described can be used as an anode material for a lithium secondary battery.

The active material A of the present invention may be, for example, kneaded with an organic binder, a conductivity aid, and solvent to form into a shape such as a sheet or pellets, or to be applied on a current collector, and integrated into said current collector to make an anode for a lithium secondary battery.

Examples of the organic binder include poly ethylene, polypropylene, ethylene-propylene polymer, butadiene rubber, styrene-butadiene rubber, butyl rubber, a polymer compound having a high ion conductivity and the like. Examples of a polymer compound having a high ion conductivity include polyvinylidene fluoride, polyethylene oxide, poly-epichlorohydrin, polyphosphazene, polyacrylonitrile, polyimide, and the like. The content of the organic binder is preferably 3 to 20 wt % per total of the anode material. Also, other than the organic binder, carboxymethyl cellulose, sodium polyacrylate, other acrylic polymer, or fatty acid ester may be added as a viscosity adjusting agent.

The kind of a conductivity aid is not particularly limited, as long as it is an electrical conductive material that does not degrade or degenerate in the configured battery. Specific examples of the conductivity aid include metallic powders or fibers such as Al, Ti, Fe, Ni, Cu, Zn, Ag, Sn, and Si, a natural graphite, a synthetic graphite, various coke powders, mesophase carbons, vapor-grown carbon fibers, pitch-type carbon fibers, PAN-type carbon fibers, or graphite such as various fired resins. The content of the conductivity aid is 0 to 20 wt % and preferably 1 to 10 wt %, per total of the anode material. If the content of the conductivity aid is insufficient, the conductivity of the anode material may be poor in cases, and likely to result in an initial high resistance. On the other hand, an excess amount of the conductivity aid may lead to a decrease in the battery capacity.

The solvent is not particularly limited and examples include N-methyl-2-pyrrolidone, dimethylformamide, isopropanol, pure water, and the like. The content of the solvent is not particularly limited. Examples of a current collector include a foil or a mesh of nickel or copper, and the like. Integration can be performed by a method of forming a material such as a roll method or a press method.

An anode obtained in a method as above may be disposed mutually opposite to a cathode via a separator and an electrolyte is added therein to prepare a lithium secondary battery. Such a lithium secondary battery exhibits superior cycle characteristics, a higher capacity and a higher initial efficiency compared to those of a conventional lithium secondary battery, in which the silicon is used as an anode electrode.

Examples of a material used for the cathode include LiNiO$_2$, LiCoO$_2$, LiMn$_2$O$_4$, LiNi$_x$Mn$_y$Co$_{1-x-y}$O$_2$, LiFePO$_4$, Li$_{0.5}$Ni$_{0.5}$Mn$_{1.5}$O$_4$, Li$_2$MnO$_3$—LiMO$_2$ (M=Co, Ni, Mn), and the like, and they may be used alone or used as a mixture thereof.

Examples of the electrolyte include a so-called organic electrolyte in which a lithium salt such as LiClO$_4$, LiPF$_6$, LiAsF$_6$, LiBF$_4$, LiSO$_3$CF$_3$ is dissolved in a non-aqueous solvent such as ethylene carbonate, diethyl carbonate, dimethoxyethane, dimethyl carbonate, tetrahydrofuran, or propylene carbonate. Furthermore, an ionic liquid using a cation of imidazolium, ammonium, or pyridinium type may be used. The counter anion is not particularly limited, and BF$_4^-$, PF$_6^-$, (CF$_3$SO$_2$)$_2$N$^-$, and the like may be used. The ionic liquid can be used as a mixture with the organic electrolyte solvent described above. An SEI (Solid-Electrolyte Interphase) formation agent such as vinylene carbonate, or fluoroethylene carbonate can be added to the electrolyte.

Also, a solid electrolyte in which the salts described above are mixed with polyethylene oxide, polyphosphazene, polyaziridine, polyethylene sulfide, or the like, or a derivative thereof, a mixture thereof, a composite thereof or the like, can be used. In this case, the solid electrolyte may function as a separator as well, thereby eliminating the need for a separator. Examples of a separator include a non-woven cloth, a cloth, or a microporous film, the major component of which is polyolefin such as polyethylene or polypropylene, or the combination thereof.

Next, the active material B of the present invention is described in detail.

The active material B is an anode active material for a lithium ion secondary battery including:

10 to 80 wt % of Si or a Si alloy having an average particle size (D50) of 0.01 to 0.6 μm, D90 of 0.01 to 1.0 μm, and a BET specific surface area determined by the BET method of 40 to 300 m$^2$/g;

90 to 5 wt % of a carbonaceous material; and 0 to 80 wt % of graphite; and the anode active material being substantially spherical with an average circularity of 0.7 to 1.0.

The Si in the active material B is not particularly limited as long as the purity thereof is that of a metallic silicon of general purpose grade or higher, and includes: a metallic silicon of general purpose grade (a purity of approximately 98 wt %), a metallic silicon of chemical grade (a purity of 2 to 4 N), a polysilicon that is chlorinated and distilled by evaporation (a purity of 4 N or higher), a monocrystalline silicon via deposition process by a monocrystalline growth method (ultrahigh purity), or a p-type or n-type material that is obtained by doping an element from the group 13 or 15 of the periodic table into such a metallic silicon, disposals from polishing or cutting a wafer generated in the manufacturing process of a semiconductor, a disposed wafer rated defective in the process and the like.

A Si alloy for the active material B is an alloy that contains Si as a major component. An element other than Si contained in the Si alloy is preferably one or more elements from the group 2 to 15 in the periodic table. And it is preferable that selection and/or the added amount of the element raises the melting point of a phase contained in the alloy to equal to or above 900° C.

In the active material B of the present invention, the average particle size (D50) of the Si compounds is 0.01 to 0.6 μm. If the average particle size (D50) is smaller than 0.01 μm, the decrease in the capacity and the initial efficiency due to the surface oxidation will be significant. If the average particle size (D50) is greater than 0.6 μm, cracks due to the expansion caused by lithium insertion will occur and the cycle life may degrade rapidly. Therefore, the preferable average particle size (D50) is 0.01 to 0.3 μm. The average particle size (D50) is a volumetric average particle size measured by the laser diffraction method or the dynamic light scattering method.

D90 is 0.01 to 1.0 μm. If D90 is greater than 1.0 μm, additional expansion of the already large particles may develop cracks not only within the Si compound but also between the Si compound and the carbonaceous material due to the stress induced by the expansion, resulting in a rapid degradation of the cycle life. Therefore, the preferable D90 is 0.01 to 0.6 μm. D90 is a particle size, at which the cumulative value starting from the smallest particle size equals to 90% of the total, measured by the laser diffraction method or the dynamic light scattering method.

Furthermore, a BET specific surface area, measured by the BET method is 40 to 300 m$^2$/g. If the BET specific surface area is smaller than 40 m$^2$/g, particles are large enough to develop severe cracks caused by lithium insertion, resulting in a rapid degradation of the cycle life. If the BET specific surface area is greater than 300 m$^2$/g, reactivity with the electrolyte increases, resulting in a rapid degradation of the cycle life, and the initial discharge efficiency decreases due to the high irreversible capacity caused by the high concentration of oxygen at the surface of Si. The preferable BET specific surface area is 70 to 300 m$^2$/g.

The content of the Si compound is 10 to 80 wt % and preferably 15 to 50 wt %. If the content of the Si compound is less than 10 wt %, a sufficiently large capacity is not obtained compared to the conventional graphite. If the content is greater than 80 wt %, the cycle life may degrade rapidly.

A carbonaceous material in the active material B is an amorphous or fine crystalline carbonaceous material, and includes a graphitizable carbon (soft carbon) which is graphitized by a thermal treatment at a temperature over 2000° C. and a non-graphitizable carbon (hard carbon) which is hard to be graphitized.

In the active material B of the present invention, the content of the carbonaceous material is 90 to 5 wt % and preferably 40 to 8 wt %. If the content of the carbonaceous material is less than 5 wt %, the carbonaceous material fails to cover the whole Si compound, causing conductive paths to be incomplete, resulting in a significant capacity degradation. If the content of the carbonaceous material is greater than 90 wt %, a sufficiently large capacity is not obtained.

The graphite in the active material B is a crystalline, in which graphene layers are parallel to the c-axis, and includes a natural graphite purified from an ore, a synthetic graphite that is obtained by graphitizing petroleum or coal pitch and the like. The forms of the raw materials include scaly, pellet-shape or spherical, cylindrical or fiber-form, and the like. In addition, an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like may be used. The particle size of the graphite contained in the anode active material of the active material B is not particularly limited as long as it is smaller than the size of the anode active material particles. The thickness of the graphite particle is preferably not greater than ⅕ of the average particle size (D50) of the active material. Addition of graphite increases the conductivity and the strength of the active material particles and improves the rate characteristics of the charge-discharge process and cycle characteristics. D002, a layer spacing for the (002) layers, determined by X-ray diffraction of the graphite particles is preferably 0.338 nm or less. Such d002 values indicate that the graphite is highly graphitized. If the value of d002 is greater than this value, the effect of conductivity improvement by the graphite is diminished.

Preferably, the graphite in the active material B has a purity of 99.9 wt % or higher, or the impurity amount of 1000 ppm or less, the S content of 0.3 wt % or less and/or a BET specific surface area of 40 m$^2$/g or smaller. If the purity is lower than 99.9 wt % or the impurity amount is greater than 1000 ppm, irreversible capacity due to the formation of SEI originated from the impurities becomes large. Thus, the initial charge-discharge efficiency, which is the discharge capacity relative to the charged capacity for the first time, shows a tendency to be small. Also, if the S content is greater than 0.3 wt %, similarly the increase in the irreversible capacity leads to the decrease in the initial charge-discharge efficiency. More preferably, the S content is 0.1 wt % or less. If the BET specific surface area of the graphite is greater than 40 m$^2$/g, the area for the reaction with the electrolyte increases, and the initial charge-discharge efficiency may be reduced.

For impurities, a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) is measured by the ICP atomic emission spectroscopy. Meanwhile, the S content is measured by combustion-adsorption treatment of the Oxygen-flask Method, followed by filtering and Ion chromatography (IC).

If the active material B of the present invention contains a carbonaceous material and graphite, the content of each material is preferably 5 to 40 wt % and 20 to 80 wt %, respectively, and more preferably 8 to 30 wt % and 40 to 70 wt %, respectively. If the content of the carbonaceous material is less than 5 wt %, the carbonaceous material fails to cover whole Si compound and the graphite, leading to insufficient bonding between the Si compound and the graphite. Thus, the formation of the active material particles is likely to have difficulties. Alternately, if the content of the carbonaceous material is greater than 40 wt %, the effectiveness of the graphite, which has a higher conductivity than the carbonaceous material, may not be effectively employed. On the other hand, if the content of the graphite is less than 20 wt %, the effectiveness of the graphite, the conductivity of which is higher than that of the carbonaceous material is not exhibited sufficiently, and if the content is greater than 80 wt %, the capacity sufficiently large enough compared to the conventional graphite is not obtained.

The active material B of the present invention is a substantially spherical composite particle and the average particle size (D50) thereof is 1 to 40 µm, and preferably 2 to 30 µm. If D50 is smaller than 1 µm, resulting higher bulk density makes the preparation of a high-density electrode challenging. If D50 is over 40 µm, the surface of the electrode prepared by coating the electrode with the material is likely to have a pronounced convexities and concaves, hampering the preparation of a uniform electrode. In addition, the average particle size of the Si compound is preferably not greater than ⅕ of the average particle size of said anode active material, and the carbonaceous material preferably covers at least the surface of the active material.

The substantially spherical composite particles include particles that have round-off corners due to the pulverization and the like of the obtained particles, particles of spherical or spheroid shape, particles of circular plate or pellet shape having a certain thickness with round-off corners, or particles of deformed shapes thereof with round-off corners and the like. The circularity of the particles is 0.7 to 1.0 and preferably 0.7 to 0.8. The circularity is determined by image analysis of an image of particles obtained by Scanning Electron Microscopy. Namely, the projected area (A) and the perimeter (PM) of a particle is measured from a photograph and the area (B) of a perfect circle with the same perimeter (PM) is determined, then the circularity is defined as A/B. When the radius of the perfect circle is r, the equations PM=$2\pi r$ and B=$\pi r^2$ are given, thus the circularity can be calculated by the equation A/B=A×$4\pi$/(PM)$^2$. Using this equation, the average circularity is obtained by calculating an average of the circularities of the composite particles among 100 or more arbitrarily chosen composite particles. Meanwhile, the average circularity may be obtained by calculating an average of the circularities of the substantially spherical particles, except the plate-like fine particles with their minor axes length shorter than 1 µm. The rounder shape of the composite particles increases the bulk density of the composite particles, thereby increasing the packing density when they are made into an anode. Also, because the carbonaceous material covers at least the surface of the active material, lithium ions dissolved in the electrolyte dissociate from solvent on the surface of the carbonaceous material in the course of the charge-discharge, and only the lithium ions react with the Si compound and/or the graphite. Thus, the degradation products of the solvent is prevented and the efficiency of the charge-discharge is improved.

Preferably, the active material B of the present invention has a structure in which the Si compound together with a carbonaceous material is interposed between thin layers of graphite having a thickness of 0.2 µm or less, the structure spreads in layers and/or in mesh-like patterns, the thin layers of graphite are curled near the surface of an active material particle to cover the active material particle.

The thin layers of graphite in the active material B are thin layers of graphite including an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like, or one layer (thickness: 0.0003 µm) to several hundreds of layers (thickness: ca. 0.2 µm) of graphene produced by subjecting the graphenes above to compression force. The less the thickness of the thin layers of graphite, the better the conductivity of electrons to the Si compound because the layer of the Si compound interposed between the thin layers of graphene and the carbonaceous material becomes thin. The thickness greater than 0.2 µm reduces the effect of the electron conduction to the thin layers of graphite. If a thin layer of graphite is observed as line-shaped in the cross-section, the length thereof is preferably not shorter than the half of the anode active material particle size, and more preferably approximately similar to the anode active material particle size. If a thin layer of graphite is mesh-like patterns, the patterns is preferably continuous over the length not shorter than the half of the anode active material particle size, and more preferably continuous over the length approximately similar to the anode active material particle size.

In the active material B, a thin layer of graphite is preferably curled near the surface of an active material particle to cover the active material particle. Such a shape reduces a risk where an electrolyte enters from the end face of the thin layers of graphite to directly contact the Si compound or the end face of the thin layer of graphite, thus the efficiency is compromised due to the reaction product formation during the charge-discharge.

Preferably, in case that the active material B of the present invention is free of graphite, the content of the Si compound is 10 to 80 wt % and the content of the carbonaceous material is 90 to 20 wt %, in the active material B.

The BET specific surface area of the active material B of the present invention measured by the BET method is more preferably 5 to 120 $m^2/g$.

Next, the production method of the active material B of the present invention will be described.

A production method for the active material B of the present invention includes the steps of:

mixing a Si compound, a carbon precursor and, as appropriate, graphite;

performing granulation/compaction;

performing pulverization and conglobation treatment to form a composite particle; and firing the composite particle in an inert gas atmosphere.

For the Si compound that is a raw material, particles having an average particle size (D50) of 0.01 to 0.6 μm, D90 of 0.01 to 1.0 μm, and a BET specific surface area measured by the BET method of 40 to 300 $m^2/g$ are used. To obtain the Si compound with a predetermined particle size, the raw material (in a form such as an ingot, a wafer or powders) of the Si compound described above is pulverized by a pulverizer. In some cases, a classifier is used. For lumps such as an ingot or a wafer, a coarse crusher such as a jaw crusher may be used as a first step to pulverize the material. This may be followed by pulverization using, for example, a ball mill (to pulverize materials to be pulverized by impact force, friction force, or compression force induced by kinetic energy, which is obtained by the motion of pulverizing media such as balls and beads), a media mixing mill, a roller mill (to pulverize materials to be pulverized using the compression force of a roller), a jet mill (to pulverize materials to be pulverized using impact force caused by crushing them to the inner liner material in the high velocity or crushing particles each other), a hammer mill, a pin mill, a disk mill (to pulverize materials to be pulverized using impact force induced by the rotation of a rotor with a fixed hammer, a fixed blade, a fixed pin or the like), a colloid mill (to pulverize materials to be pulverized using shear force), a high-pressure wet collision disperser with a mutually facing configuration ("Ultimizer") and the like. Then the Si compound with the predetermined particle size may be obtained by the further finer pulverization.

For further finer pulverization, for example, a wet-type beads mill may be used, while the size of the beads is reduced gradually, to obtain a very fine particles. For media used in the beads mill, zirconia that possesses high strength is preferable. The size of the beads may be changed according to the size of the Si compounds to be pulverized. Preferably, for example, the beads of 0.5 to 1.0 mm size are used for the Si compound having the average particle size (D50) of 10 to 40 μm, the beads of 0.1 to 0.5 mm size are used for the Si compound having the average particle size (D50) of 0.5 to 10 μm, and the beads of 0.03 to 0.1 mm size are used for the Si compound having the average particle size (D50) of 0.1 to 0.5 μm. In case that the beads of the size smaller than 0.1 mm, centrifugal separation is preferably used for the separation of the beads and the slurry.

In case that a dispersant is used during the pulverization, said dispersant is preferably alcohols such as methanol, ethanol or isopropanol, or hydrocarbon solvents such as hexane or toluene. Water is unsuitable since it causes intense Si oxidation. Also, a dispersant of anion-type, cation-type or nonion-type may be added to reduce the viscosity of the slurry as appropriate. The concentration of the slurry is not particularly limited. For the efficient pulverization, the prevention of aggregation during the pulverization, and the reduction of the slurry viscosity, the concentration is preferably 5 to 25 wt %, and particularly preferably 5 to 20 wt %. If the concentration is less than 5 wt %, the efficiency of the pulverization may be reduced, and if the concentration is higher than 25 wt %, then the slurry viscosity may increase to inhibit pulverization due to the decrease in the efficiency of the pulverization, clogging or the like.

Also, to adjust the particle size distribution after pulverization, dry classification, wet classification or sifting classification may be used. The dry classification mainly utilizes air flow: the processes of dispersion, separation (separating fine particles from coarse particles), collection (separating solids from gas), and exhaust are performed sequentially or simultaneously. The pretreatment (adjusting water content, dispersion characteristics, humidity and the like) prior to the classification or adjustment of water content and oxygen content in the air flow used may be performed in order to prevent the reduction in classification efficiency due to interparticulate interference, particle shapes, turbulent air flow, velocity distribution, electrostatic effects and the like. In the system in which a dry classifier is integrated into a pulverizer, pulverization and classification can be performed without interruption, resulting in a desired particle size distribution.

Other methods to obtain Si compound with a predetermined particle size include a method in which the Si compound is heated and vaporized by plasma, laser or the like and solidified in an inert gas, and a method of CVD, plasma CVD or the like using gaseous raw materials. These methods are suitable for obtaining ultra fine particles with a size 0.1 μm or smaller.

A carbon precursor that is a raw material is not particularly limited as long as it is a polymer with carbon as a major component, and can be converted to a carbonaceous material by the thermal treatment in an inert gas atmosphere. Examples thereof include petroleum-based pitch, coal-based pitch, synthetic pitch, tars, cellulose, sucrose, polyvinyl chloride, polyvinyl alcohols, phenol resin, furan resin, furfuryl alcohol, polystyrene, epoxy resin, polyacrylonitrile, melamine resin, acrylic resin, polyamide imide resin, polyamide resin, polyimide resin, and the like.

For graphite that is a raw material, a natural graphite, a synthetic graphite that is obtained by graphitizing petroleum or coal pitch and the like can be used. The forms thereof include scaly, pellet-shape or spherical, cylindrical or fiber-form, and the like. In addition, an expanded graphite (an expanded graphite is obtained by subjecting a graphite described above to acid treatment, oxidation treatment, followed by thermal treatment, thereby expanding the graphite to delaminate a part between layers of graphite resulting in an accordion-shape) or a pulverized expanded graphite, or graphenes, the layers of which are delaminated therebetween by ultrasonic treatment and the like, and the like may be used. The graphite raw material is adjusted in its size for use in the mixing step in advance. The particle size before mixing is 1 to 100 μm for the natural graphite and synthetic graphite, and 5 μm to 5 mm for the expanded graphite, pulverized expanded graphite and graphene.

These Si compound, carbon precursor and, as appropriate, graphite can be mixed by kneading the Si compound, carbon precursor and, as appropriate, graphite under heat, if the carbon precursor softens or liquefies by heat. If the carbon precursor can be dissolved in a solvent, the Si compound, the carbon precursor, and graphite as appropriate, are blended in the solvent. The Si compound, the carbon precursor and the graphite as appropriate are dispersed and mixed in a solution in which the carbon precursor is dissolved, then the solvent may be removed subsequently. The solvent used is not particularly limited, as long as it can dissolve the carbon precursor. In case that pitches or tars are used as a carbon precursor, examples of the solvent include quinoline, pyridine, toluene, benzene, tetrahydrofuran, creosote oil, and the like. In case that polyvinyl chloride is used as a carbon precursor, examples of the solvent include tetrahydrofuran, cyclohexanone, nitrobenzene, and the like, and in case that phenol resin or furan resin is used as a carbon precursor, examples of the solvents include ethanol, methanol and the like.

As a method of mixing, a kneader can be used in case that the carbon precursor is heated and softened. In case that a solvent is used, in addition to the kneader above, a Nauta mixer, a Lödige mixer, a Henschel mixer, a high-speed mixer, a homo-mixer, and the like may be used. Also, the solvent is removed by jacket heating on the apparatus, followed by a vibrating dryer, a paddle dryer or the like.

A mixture of the Si compound, the carbon precursor, a lithium compound, and graphite as appropriate is granulated and compacted by solidifying the carbon precursor or agitating the mixture for a substantial amount of time during the removal of the solvent in the apparatus. Alternately, a mixture in which the carbon precursor has been solidified or the solvent has been removed may be granulated and compacted by compressing the mixture by a compressor such as a roller compactor, then pulverizing to coarse pieces by a pulverizer. Sizes of these materials after granulation/compaction are preferably 0.1 to 5 mm from the viewpoint of easy handling of the materials in the later pulverizing step.

Preferable methods of pulverizing the materials after granulation/compaction are dry pulverizing methods such as a ball mill (to pulverize materials to be pulverized by compression force), a media mixing mill, a roller mill (to pulverize materials to be pulverized using the compression force of a roller), a jet mill (to pulverize materials to be pulverized using impact force caused by crushing them to the inner liner material in the high velocity or crushing particles each other), a hammer mill, a pin mill, a disk mill (to pulverize materials to be pulverized using impact force induced by the rotation of a rotor with a fixed hammer, a fixed blade, a fixed pin or the like). To adjust the particle size distribution after the pulverization, dry classification such as air classification or sifting classification can be used. In the system in which a classifier is integrated into a pulverizer, pulverization and classification can be performed without interruption, resulting in a desired particle size distribution.

The composite particles obtained by pulverizing are fired in an inert atmosphere, such as in argon gas or nitrogen gas flow, or in vacuum. The firing temperature is preferably 600 to 1000° C. If the firing temperature is lower than 600° C., the irreversible capacity of amorphous carbon originating from the carbon precursor is large and the cycle characteristics are poor, thus the battery characteristics are likely to be poor.

A production method for the active material B of the present invention preferably includes the steps of:
mixing and dispersing a Si compound, a carbon precursor and, as appropriate, graphite in the solvent in which said carbon precursor is dissolved;
performing granulation/compaction;
performing pulverization and conglobation treatment to form a composite particle having a round shape; and
firing said composite particle in an inert gas atmosphere.

Methods for pulverizing the material after granulation/compaction and applying conglobation treatment include: a method in which, after pulverizing the material according to the method described above and adjusting the particle size, the material is passed through a dedicated conglobation apparatus; and a method in which pulverization of the materials to be pulverized using the impact force induced by the rotation of a jet mill or a rotor is repeated or the duration for the treatment is extended. Examples of the dedicated conglobation apparatus include Faculty®, Nobilta®, and Mechano Fusion® available from Hosokawa Micron Group, COMPOSI available from Nippon Coke and Engineering Co., Ltd., Hybridization System available from Nara Machinery Co., Ltd., Kryptron Orb and Kryptron Eddy available from Earth Technica Co., Ltd. and the like.

A production method for the active material B of the present invention preferably includes the steps of:
mixing and dispersing a Si compound, a carbon precursor and expanded graphite or flake graphite in the solvent in which said carbon precursor is dissolved;
performing granulation/compaction;
performing pulverization and conglobation treatment to form a composite particle having a round shape; and
firing said composite particle in an inert gas atmosphere.

For the expanded graphite and flake graphite, acid-treated graphite which is natural or synthetic graphite subjected to acid treatment and oxidation treatment, is used as a raw material. An expanded graphite is obtained by subjecting an acid-treated graphite to thermal treatment, thereby expanding the graphite to delaminate a part between layers of graphite resulting in an accordion-shape. A flake graphite is a pulverized material of the expanded graphite or a graphene, the layers of which are delaminated therebetween by ultrasonic treatment and the like. The expanded graphite can be expanded to a greater extent by performing the acid treatment sufficiently and increasing the temperature gradient of the thermal treatment. Thus the thickness of the graphite thin layers of the obtained anode active material can be made thin by performing the mixing and dispersion sufficiently, resulting in the excellent electrical conductivity and cycle characteristics.

The active material B of the present invention obtained as described can be used as an anode material for a lithium ion secondary battery.

The active material B of the present invention may contain, for example, an organic binder and/or a conductivity aid (an anode active material mixture), and said anode active material mixture and a solvent are kneaded to form into a shape such as a sheet or pellets, or to be applied on a current collector, and integrated into said current collector to make an anode for a lithium ion secondary battery.

Examples of the organic binder include poly ethylene, polypropylene, ethylene-propylene polymer, butadiene rubber, styrene-butadiene rubber, butyl rubber, a polymer compound having a high ion conductivity and the like. Examples of the polymer compound having a high ion conductivity include polyvinylidene fluoride, polyethylene oxide, polyepichlorohydrin, polyphosphazene, polyacrylonitrile, polyimide, and the like. The content of the organic binder is preferably 3 to 20 wt % per total of the anode active material mixture. Also, the active material B of the present invention may contain, other than the organic binder, carboxymethyl cellulose, sodium polyacrylate, other acrylic polymer, or fatty acid ester as a viscosity adjusting agent.

The kind of a conductivity aid is not particularly limited, as long as it is an electrical conductive material that does not degrade or degenerate in the configured battery. Specific examples of the conductivity aid include metallic powders or fibers such as Al, Ti, Fe, Ni, Cu, Zn, Ag, Sn, and Si, a natural graphite, a synthetic graphite, various coke powders, mesophase carbons, vapor-grown carbon fibers, pitch-type carbon fibers, PAN-type carbon fibers, or graphite such as various fired resins. The content of the conductivity aid is preferably 0 to 20 wt % and particularly preferably 1 to 10 wt %, per total of the anode active material mixture. If the content of the conductivity aid is insufficient, the conductivity of the anode material may be poor in cases, and likely to result in an initial high resistance. On the other hand, an excess amount of the conductivity aid may lead to a decrease in the battery capacity.

The solvent is not particularly limited and examples include N-methyl-2-pyrrolidone, dimethylformamide, isopropanol, pure water, and the like. The content of the solvent is not particularly limited. Examples of the current collector include a foil or a mesh of nickel or copper, and the like. Integration can be performed by a method of forming a material such as a roll method or a press method.

An anode obtained in a method as above may be disposed mutually opposite to a cathode via a separator and an electrolyte is added therein to prepare a lithium ion secondary battery. Such a lithium ion secondary battery exhibits superior cycle characteristics, a higher capacity and a higher initial efficiency compared to a conventional lithium ion secondary battery, in which the silicon is used as an anode material.

Examples of the material used for the cathode include $LiNiO_2$, $LiCoO_2$, $LiMn_2O_4$, $LiNi_xMn_yCo_{1-x-y}O_2$, $LiFePO_4$, $Li_{0.5}Ni_{0.5}Mn_{1.5}O_4$, $Li_2MnO_3$—$LiMO_2$ (M=Co, Ni, Mn), a Li foil, and the like, and they may be used alone or used as a mixture thereof.

Examples of the electrolyte include a so-called organic electrolyte in which a lithium salt such as $LiClO_4$, $LiPF_6$, $LiAsF_6$, $LiBF_4$, $LiSO_3CF_3$ is dissolved in a non-aqueous solvent such as ethylene carbonate, diethyl carbonate, dimethoxyethane, dimethyl carbonate, tetrahydrofuran, or propylene carbonate. Furthermore, an ionic liquid using a cation of imidazolium, ammonium, or pyridinium type may be used. The counter anion is not particularly limited, and $BF_4^-$, $PF_6^-$, $(CF_3SO_2)_2N^-$, and the like may be used. The ionic liquid can be used as a mixture with the organic electrolyte solvent described above. An SEI (Solid-Electrolyte Interphase) formation agent such as vinylene carbonate, or fluoroethylene carbonate can be added to the electrolyte.

Also, a solid electrolyte in which the salts described above are mixed with polyethylene oxide, polyphosphazene, polyaziridine, polyethylene sulfide, or the like, or a derivative thereof, a mixture thereof, a composite thereof or the like, can be used. In this case, the solid electrolyte may function as a separator as well, thereby eliminating the need for a separator. Examples of the separator include a nonwoven cloth, a cloth, or a microporous film, the major component of which is polyolefin such as polyethylene or polypropylene, or the combination thereof.

EXAMPLES

The present invention is described below specifically using examples and comparative examples, but the present invention is not limited to these examples.

Example 1

A chemical-grade metallic Si (purity 3N) with an average particle size (D50) of 7 μm was mixed in ethanol at 25 wt %. The mixture was processed in a fine pulverizing wet beads mill using zirconia beads (0.3 mm diameter) for 6 hours and an ultra fine particulate Si slurry (an average particle size (D50): 0.3 μm, BET specific surface area when dried: 60 $m^2$/g) was obtained.

A natural graphite having a particle size (the width in the (200) plane direction) of 0.5 mm and a thickness of 0.02 mm was immersed in a solution (sodium nitrate 1 wt %, and potassium permanganate 7 wt % added in concentrated sulfuric acid) for 24 hours, then washed in water and dried. Thus, the acid-treated graphite was obtained. The acid-treated graphite was introduced in a vibrating powder feeder and fed into a mullite tube (length: 1 m, inner diameter: 11 mm) heated at 850° C. by an electric heater, using a nitrogen gas flow of 10 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.5 mm, which was the width of the original graphite, but its thickness was expanded to 4 mm, 200 times of the original graphite. The appearance of the expanded graphite was coil-shape, and SEM observation confirmed that the graphite layers were delaminated resulting in an accordion-shape.

24 g of the ultra fine particulate Si slurry, 12 g of the expanded graphite, 5 g of a resol-type phenol resin (weight average molecular weight (Mw): 460), and 1.6 L of ethanol were charged in a mixing container. After 15 minutes of ultrasonic treatment, the mixture was mixed and stirred for 30 minutes using a homo-mixer. Then, the mixture was transferred to a rotary evaporator, rotated and heated in a warm bath heated at 65° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 2 days. Thus 20 g of the dried mixture ("freely settled" bulk density: 67 g/L) was obtained.

The dried mixture was processed for granulation/compaction by passing through a three roll mill twice to produce particles of 2 mm in size and 385 g/L of "freely settled" bulk density.

Next, these particles after granulation/compaction process were introduced into a new power mill and pulverized at 21000 rpm for 900 seconds while being water-cooled and processed for conglobation simultaneously. Thus, the conglobated particles having a "freely settled" bulk density of 650 g/L were obtained. The obtained particles were placed on an aluminum boat and fired in a tubular furnace under a nitrogen gas stream, at the maximum temperature of 900° C. for an hour. Then, the fired material was passed through a mesh having an aperture of 45 μm and an anode active material having an average particle size (D50) of 19 μm and a "freely settled" bulk density of 761 g/L was obtained.

FIG. 1 is an SEM image of the obtained anode active material particles. The particles were substantially spherical particles, in which the anode active material particle graphite thin layers 12 were curled to cover the active material particles. The average circularity was 0.74 and the content of the plate-like fine particles was 0 wt %.

Figure 2:
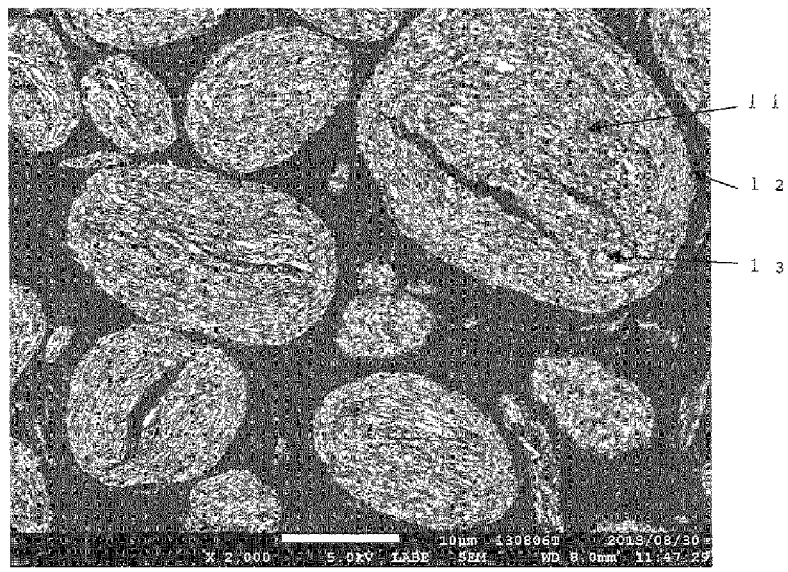
FIG. 2 is a secondary electron image by FE-SEM of the cross-section of particles of an anode active material obtained in Working Example 1.

FIG. 2 is a secondary electron image by FE-SEM of the cross-section of particles of an anode active material. The cross-section was prepared by an ion beam. The anode active material particle was substantially spherical. Inside the anode active material particles, a structure in which the Si fine particles (0.05 to 0.2 μm in length) together with a carbonaceous material were interposed between graphite thin layers 11 (0.02 to 0.2 μm in thickness), was spread in mesh-like patterns and stacked. The spacing 13 between the graphite layers was 0.05 to 1 μm. The carbonaceous material covered the Si fine particles closely. Also, the graphite thin layer 12 was curled near the surface of an active material particle to cover the active material particle.

The BET specific surface area determined by the BET method using nitrogen gas was 50 $m^2/g$. In the powder X-ray diffraction, the diffraction peak corresponding to (002) plane of the graphite was observed and d002 was 0.336 nm. Also, a very broad diffraction peak originating from the amorphous carbon of the carbonaceous material was observed in the vicinity of the diffraction peak corresponding to (002) plane of the graphite. The diffraction peak corresponding to (100) plane of Si was observed and d002 was 0.314 nm.

Preparation of an Anode for a Lithium Ion Secondary Battery

A slurry containing an anode material mixture was prepared by mixing: 95.2 wt % of the anode active material obtained; 0.6 wt % of acetylene black as a conductivity aid; 1.6 wt % of carboxymethyl cellulose (CMC) and 2.6 wt % of styrene butadiene rubber (SBR) as binders; and water (all wt % were the contents per total solid content).

The slurry obtained was applied on a copper foil having a thickness of 18 μm (the coated amount as a solid content: 3.5 $mg/cm^2$) using an applicator. The coated material was dried in a vacuum dryer at 110° C. for 0.5 hours. After drying, the dried material was punched out to a circle of 14 mmφ in the diameter, pressed uniaxially at a pressure of 0.6 $t/cm^2$. Furthermore, the pressed material was subjected to a thermal treatment at 110° C. for 3 hours in vacuum. Thus an anode for a lithium ion secondary battery formed with an anode material mixture layer of 29 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. For the electrolyte, a mixed solvent of ethylene carbonate and diethyl carbonate at a volumetric ratio of 1:1 was used. The cell for evaluation was further placed in a sealed glass container with a silica gel. The electrodes penetrated through the silicone rubber lid were connected to a charge/discharge apparatus (SM-8, manufactured by Hokuto Denko Corp.).

Evaluation Conditions

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Example 2

36 g of the ultra fine particulate Si slurry prepared in the same manner as in Example 1, 18 g of the expanded graphite, 7.5 g of a resol-type phenol resin (weight average molecular weight (Mw): 490), and 2.4 L of ethanol were charged in a mixing container. Ultrasonic treatment was performed for 15 minutes. Then, the mixture was transferred to a rotary evaporator, rotated and heated in a warm bath heated at 50° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 2 days. Thus 32 g of the dried mixture ("freely settled" bulk density: 66 g/L) was obtained.

The dried mixture was processed for granulation/compaction by passing through a three roll mill twice to produce particles of 2 mm in size and 340 g/L of "freely settled" bulk density.

Next, these particles after granulation/compaction process were introduced into a new power mill and pulverized at 21000 rpm for 900 seconds while being water-cooled and processed for conglobation simultaneously. Thus, the conglobated particles having a "freely settled" bulk density of 490 g/L were obtained.

The obtained particles were placed on an aluminum boat and fired in a tubular furnace under a nitrogen gas stream, at the maximum temperature of 900° C. for an hour. Then, the fired material was passed through a mesh having an aperture of 45 μm and an anode active material having an average particle size (D50) of 9 μm and a "freely settled" bulk density of 567 g/L was obtained.

Figure 3:
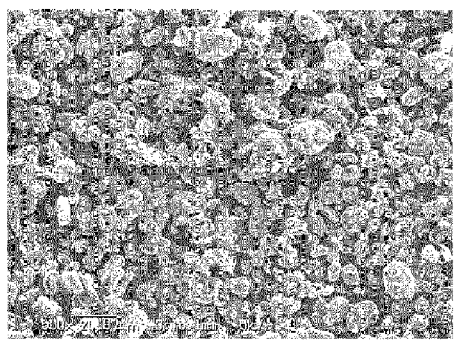
FIG. 3 is a secondary electron image by SEM of particles of an anode active material obtained in Working Example 2.

FIG. 3 is an SEM image of the obtained anode active material. The particles were substantially spherical particles, in which the anode active material particle graphite thin layers 12 were curled to cover the active material particles. The average circularity was 0.77 and the content of the plate-like fine particles was 0 wt %.

The BET specific surface area determined by the BET method using nitrogen gas was 47 $m^2/g$. In the powder X-ray diffraction, the diffraction peak corresponding to (002) plane of the graphite was observed and d002 was 0.336 nm. Also, a very broad diffraction peak originating from the amorphous carbon of the carbonaceous material was observed in the vicinity of the diffraction peak corresponding to (002) plane of the graphite. The diffraction peak corresponding to (100) plane of Si was observed and d002 was 0.314 nm.

A lithium ion secondary battery using the anode active material obtained was prepared as follows.

Preparation of an Anode for a Lithium Ion Secondary Battery

A slurry containing an anode material mixture was prepared by mixing: 90.9 wt % of the anode active material obtained; 0.4 wt % of acetylene black as a conductivity aid; 8.7 wt % of polyvinylidene fluoride (PVDF) as binders; and NMP (all wt % were the contents per total solid content).

The slurry obtained was applied on a copper foil having a thickness of 18 μm (the coated amount as a solid content: 1.8 mg/cm$^2$) using an applicator. The coated material was dried in a vacuum dryer at 110° C. for 0.5 hours. After drying, the dried material was punched out to a circle of 14 mmφ in the diameter, pressed uniaxially at a pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 17 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (16 mmφ and thickness of 0.2 mm) and a stainless steel foil serving as a substrate thereof was dipped in an electrolyte and stacked in this order. The lid was screwed onto the cell. All procedures were done in a glove box. For the electrolyte, a mixed solvent of ethylene carbonate and diethyl carbonate at a volumetric ratio of 1:1 was used. The cell for evaluation was further placed in a sealed glass container with a silica gel. The electrodes penetrated through the silicone rubber lid were connected to a charge/discharge apparatus.

Evaluation Conditions

The cell for evaluation was tested for cycle life test in the environmental chamber controlled to 25° C. The cell was charged to 0.01 V at a constant current of 1.4 mA and was charged at a constant voltage of 0.01 V until the current reached 0.2 mA. Also, the cell was discharged at a constant current of 1.4 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Example 3

A chemical-grade metallic Si (purity 3N) with an average particle size (D50) of 7 μm was mixed in ethanol at 21 wt %. The mixture was processed in a fine pulverizing wet beads mill using zirconia beads (0.3 mm diameter) for 6 hours and an ultra fine particulate Si slurry (an average particle size (D50): 0.3 μm, BET specific surface area when dried: 100 m$^2$/g) was obtained.

The acid-treated natural graphite (particle size (width in (200) plane direction): 0.3 mm, thickness: 10 μm) was introduced in a vibrating powder feeder and fed into a mullite tube (length: 1 m, inner diameter: 20 mm) heated at 850° C. by an electric heater, using a nitrogen gas flow of 12 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.3 mm, which was the width of the original graphite, but its thickness was expanded to 2.4 mm, 240 times of the original graphite. The appearance of the expanded graphite was coil-shape, and SEM observation confirmed that the graphite layers were delaminated resulting in an accordion-shape.

95.7 g of the ultra fine particulate Si slurry, 37.5 g of the expanded graphite, 23.5 g of a resol-type phenol resin (weight average molecular weight (Mw): 370), and 5 L of ethanol were charged in a mixing container. The mixture was mixed and stirred for 60 minutes using a homo-mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 1 day. Thus 80 g of the dried mixture ("freely settled" bulk density: 87 g/L) was obtained.

The dried mixture was processed for granulation/compaction by passing through a three roll mill twice and sifted through a sieve with a 1 mm aperture to produce particles of 528 g/L of "freely settled" bulk density.

Next, these particles after granulation/compaction process were introduced into a new power mill and pulverized at 21000 rpm for 900 seconds while being water-cooled and processed for conglobation simultaneously. Thus, the conglobated particles having a "freely settled" bulk density of 633 g/L were obtained. The obtained particles were placed on a quartz boat and fired in a tubular furnace under a nitrogen gas stream, at the maximum temperature of 900° C. for an hour. Then, the fired material was passed through a mesh having an aperture of 45 μm and composite particles having an average particle size (D50) of 17.5 μm and a "freely settled" bulk density of 807 g/L were obtained.

Figure 4:
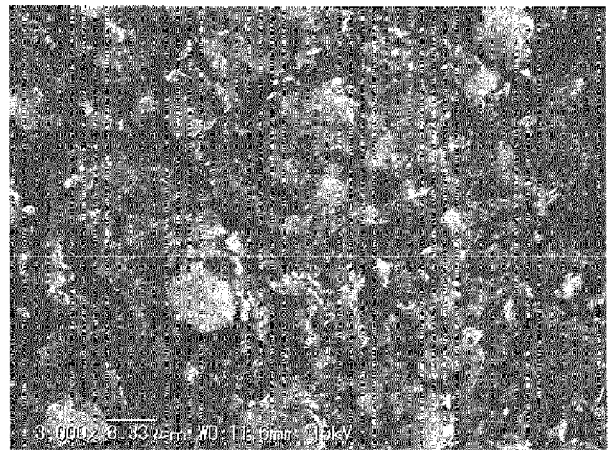
FIG. 4 is a secondary electron image by SEM of particles of an anode active material obtained in Working Example 3.

The composite particles were introduced into the air classifier (ATP-20, manufactured by Hosokawa Micron Group) and classified at a classifier rotational rate of 60000 rpm and an air flow volume of 8 m$^3$/m. The fine particles were collected by a dust collection bag filter and the anode active material having an average particle size (D50) of 4.8 μm and "freely settled" bulk density of 204 g/L was obtained. FIG. 4 is an SEM image of the obtained anode active material particles. The particles included substantially spherical particles, in which the anode active material particle graphite thin layers 12 were curled to cover the active material particles, as well as plate-like fine particles. The average circularity was 0.75 and the content of the plate-like fine particles was 77.9 wt %. The BET specific surface area determined by the BET method using nitrogen gas was 56 m$^2$/g.

Figure 5:
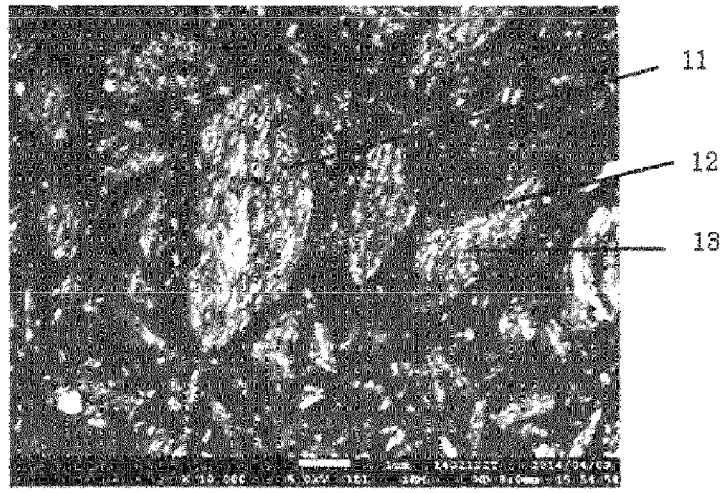
FIG. 5 is a secondary electron image by FE-SEM of the cross-section of particles of an anode active material obtained in Working Example 3.

FIG. 5 is a secondary electron image by FE-SEM of the cross-section of particles of an anode active material. The cross-section was prepared by an ion beam. The anode active material particles are composed of substantially spherical particles and plate-like fine particles. Inside the substantially spherical particle, the structure in which the Si fine particles together with a carbonaceous material were interposed between thin layers of graphite spread in a mesh-like pattern and stacked. The carbonaceous material covered the Si fine particles closely. Also, the graphite thin layer was curled near the surface of an active material particle to cover the active material particle. The plate-like fine particle had a structure similar to the substantially spherical particle described above though the number of stacked layers was less than that of the substantially spherical particle. The surface of the plate-like fine particle was covered with a graphite thin layer or a carbonaceous material.

Preparation of an Anode for a Lithium Ion Secondary Battery

A slurry containing an anode material mixture was prepared by mixing: 95.4 wt % of the anode active material obtained; 0.5 wt % of acetylene black as a conductivity aid; 1.5 wt % of carboxymethyl cellulose (CMC) and 2.6 wt % of styrene butadiene rubber (SBR) as binders; and water (all wt % were the contents per total solid content).

The slurry obtained was applied on a copper foil having a thickness of 18 μm (the coated amount as a solid content: 1.5 mg/cm$^2$) using an applicator. The coated material was dried in a vacuum drier at 110° C. for 0.5 hours. After drying, the dried material was punched out to a circle of 14 mm in the diameter, pressed uniaxially at a pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 16 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1, added FEC (fluoroethylene carbonate) as an additive. To this, LiPF$_6$ was dissolved to the concentration of 1.2 vol/L, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Example 4

A chemical-grade metallic Si (purity 3N) with an average particle size (D50) of 7 μm was mixed in ethanol at 24 wt %. The mixture was processed in a fine pulverizing wet beads mill using zirconia beads (0.3 mm diameter) for 6 hours and an ultra fine particulate Si slurry (an average particle size (D50): 0.3 μm, BET specific surface area when dried: 100 m$^2$/g) was obtained.

The acid-treated natural graphite (particle size (width in the (200) plane direction): 0.3 mm, thickness: 10 μm) was introduced in a vibrating powder feeder and fed into a mullite tube (length: 1 m, inner diameter: 20 mm) heated at 850° C. by an electric heater, using a nitrogen gas flow of 12 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.3 mm, which was the width of the original graphite, but its thickness was expanded to 2.4 mm, 240 times of the original graphite. The appearance of the expanded graphite was coil-shape, and SEM observation confirmed that the graphite layers were delaminated resulting in an accordion-shape.

98.8 g of the ultra fine particulate Si slurry, 48.0 g of the expanded graphite, 20.0 g of a resol-type phenol resin (weight average molecular weight (Mw): 370), and 5.9 L of ethanol were charged in a mixing container. The mixture was mixed and stirred for 90 minutes using a homo-mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 1 day. Thus 86 g of the dried mixture ("freely settled" bulk density: 77 g/L) was obtained.

The dried mixture was processed for granulation/compaction by passing through a three roll mill twice and sifted through a sieve with a 1 mm aperture to produce particles of 303 g/L of "freely settled" bulk density.

Next, these particles after granulation/compaction process were then introduced into a new power mill and pulverized at 21000 rpm for 900 seconds while being water-cooled and processed for conglobation simultaneously. Thus, the conglobated particles having a "freely settled" bulk density of 478 g/L were obtained. The obtained particles were placed on a quartz boat and fired in a tubular furnace under a nitrogen gas stream, at the maximum temperature of 900° C. for an hour. Then, the fired material was passed through a mesh having an aperture of 45 μm and composite particles having an average particle size (D50) of 16.5 μm and a "freely settled" bulk density of 573 g/L were obtained.

Figure 6:
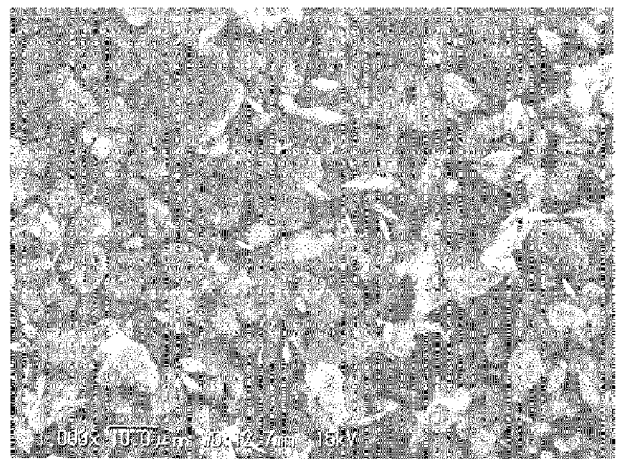
FIG. 6 is a secondary electron image by SEM of particles of an anode active material obtained in Working Example 4.

The composite particles were introduced into the air classifier (ATP-50, manufactured by Hosokawa Micron Group) and classified at a classifier rotational rate of 18000 rpm and an air flow volume of 1.6 m$^3$/min. The fine particles were collected by a cyclone collector and the anode active material having an average particle size (D50) of 5.9 μm and "freely settled" bulk density of 293 g/L was obtained. FIG. 6 is an SEM image of the obtained anode active material particles. The particles contained substantially spherical particles, in which the anode active material particle graphite thin layers 12 were curled to cover the active material particles, as well as plate-like fine particles. The average circularity was 0.74 and the content of the plate-like fine particles was 1.8 wt %. The BET specific surface area determined by the BET method using nitrogen gas was 30 m$^2$/g.

Preparation of an Anode for a Lithium Ion Secondary Battery

A slurry containing an anode material mixture was prepared by mixing: 95.6 wt % of the anode active material obtained; 0.5 wt % of acetylene black as a conductivity aid; 1.5 wt % of carboxymethyl cellulose (CMC) and 2.4 wt % of styrene butadiene rubber (SBR) as binders; and water (all wt % were the contents per total solid content).

The slurry obtained was applied on a copper foil having a thickness of 18 μm (the coated amount as a solid content: 2.5 mg/cm$^2$) using an applicator. The coated material was dried in a vacuum dryer at 110° C. for 0.5 hours. After drying, the dried material was punched out to a circle of 14 mmφ in the diameter, pressed uniaxially at a pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 21 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1, added FEC (fluoroethylene carbonate) as an additive. To this, $LiPF_6$ was dissolved to the concentration of 1.2 vol/L, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Example 5

A chemical-grade metallic Si (purity 3N) with an average particle size (D50) of 7 μm was mixed in ethanol at 25 wt %. The mixture was processed in a fine pulverizing wet beads mill using zirconia beads (0.3 mm diameter) for 6 hours and an ultra fine particulate Si slurry (an average particle size (D50): 0.4 μm, BET specific surface area when dried: 60 m$^2$/g) was obtained.

The acid-treated high-purity natural graphite (particle size (width in the (200) plane direction): 0.15 mm, thickness: 10 μm, purity: 99.9 wt % or higher, S content: 0.3 wt % or less) was introduced in a vibrating powder feeder and fed into a mullite tube (length: 1 m, inner diameter: 11 mm) heated at 850° C. by an electric heater, using a nitrogen gas flow of 12 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.15 mm, which was the width of the original graphite, but its thickness was expanded to 0.4 mm, 40 times of the original graphite. The appearance of the expanded graphite was coil-shape, and SEM observation confirmed that the graphite layers were delaminated resulting in an accordion-shape.

466.4 g of the ultra fine particulate Si slurry, 426.2 g of the expanded graphite, 86.5 g of a resol-type phenol resin (weight average molecular weight (Mw): 460), and 6.4 L of ethanol were charged in a mixing container. The mixture was mixed and stirred for 26 minutes using an in-line mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 1 day. Thus 588 g of the dried mixture ("freely settled" bulk density: 170 g/L) was obtained.

The dried mixture was processed for granulation/compaction by passing through a three roll mill twice and sifted through a sieve with a 1 mm aperture to produce particles of 308 g/L of "freely settled" bulk density.

Next, these particles after granulation/compaction process were introduced into a new power mill and pulverized at 21000 rpm for 900 seconds while being water-cooled and processed for conglobation simultaneously. Thus, the conglobated particles having a "freely settled" bulk density of 437 g/L were obtained.

Figure 7:
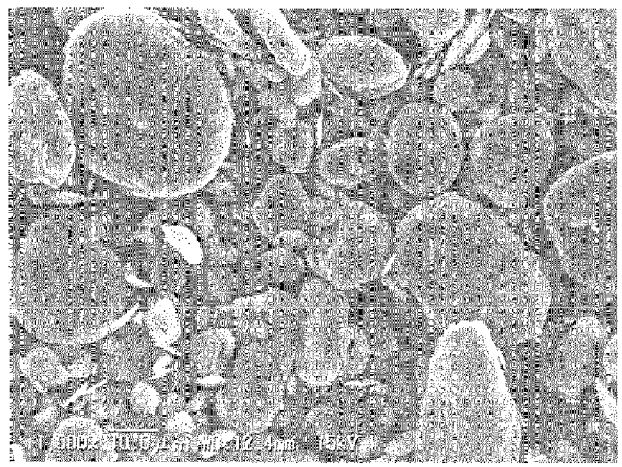
FIG. 7 is a secondary electron image by SEM of particles of an anode active material obtained in Working Example 5.

The obtained particles were placed on a quartz boat and fired in a tubular furnace under a nitrogen gas stream, at the maximum temperature of 900° C. for an hour. Thus the composite particles having a "freely settled" bulk density of 549 g/L were obtained. The composite particles were introduced into the air classifier (ATP-50, manufactured by Hosokawa Micron Group) and classified at a classifier rotational rate of 5000 rpm and an air flow volume of 1.6 m$^3$/min. The fine particles were collected by a cyclone collector and the anode active material having an average particle size (D50) of 10.0 μm and "freely settled" bulk density of 558 g/L was obtained. FIG. 7 is an SEM image of the obtained anode active material particles. The particles contained substantially spherical particles, in which the anode active material particle graphite thin layers 12 were curled to cover the active material particles, as well as plate-like fine particles. The average circularity was 0.70 and the content of the plate-like fine particles was 1.2 wt %. The BET specific surface area determined by the BET method using nitrogen gas was 29.0 m$^2$/g.

Preparation of an Anode for a Lithium Ion Secondary Battery

A slurry containing an anode material mixture was prepared by mixing: 95.4 wt % of the anode active material obtained; 0.5 wt % of acetylene black as a conductivity aid; 1.5 wt % of carboxymethyl cellulose (CMC) and 2.6 wt % of styrene butadiene rubber (SBR) as binders; and water (all wt % were the contents per total solid content).

The slurry obtained was applied on a copper foil having a thickness of 18 μm (the coated amount as a solid content: 3.0 mg/cm$^2$) using an applicator. The coated material was dried in a vacuum dryer at 110° C. for 0.5 hours. After drying, the dried material was punched out to a circle of 14 mmφ in the diameter, pressed uniaxially at the pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 22 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1, added FEC (fluoroethylene carbonate) as an additive. To this, LiPF$_6$ was dissolved to the concentration of 1.2 mol/L, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Example 6

A chemical-grade metallic Si (purity 3N) with an average particle size (D50) of 7 μm was mixed in ethanol at 25 wt %. The mixture was processed in a fine pulverizing wet beads mill using zirconia beads (0.3 mm diameter) for 6 hours and an ultra fine particulate Si slurry (an average particle size (D50): 0.4 μm, BET specific surface area when dried: 60 m$^2$/g) was obtained.

The acid-treated high-purity natural graphite (particle size (width in the (200) plane direction): 0.15 mm, thickness: 10 μm, purity: 99.9 wt % or higher, S content: 0.3 wt % or less) was introduced in a vibrating powder feeder and fed into a mullite tube (length: 1 m, inner diameter: 11 mm) heated at 850° C. by an electric heater, using a nitrogen gas flow of 12 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.15 mm, which was the width of the original graphite, but its thickness was expanded to 0.4 mm, 40 times of the original graphite. The appearance of the expanded graphite was coil-shape, and SEM observation confirmed that the graphite layers were delaminated resulting in an accordion-shape.

145.7 g of the ultra fine particulate Si slurry, 133.2 g of the expanded graphite, 27 g of a resol-type phenol resin (weight average molecular weight (Mw): 460), and 2 L of ethanol were charged in a mixing container. The mixture was mixed and stirred for 8.25 minutes using an in-line mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 1 day. Thus 188 g of the dried mixture ("freely settled" bulk density: 132 g/L) was obtained.

The dried mixture was processed for granulation/compaction by passing through a three roll mill twice and sifted through a sieve with a 1 mm aperture to produce particles of 235 g/L of "freely settled" bulk density.

Next, these particles after granulation/compaction process were then introduced into a new power mill and pulverized at 21000 rpm for 900 seconds while being water-cooled and processed for conglobation simultaneously. Thus, the conglobated particles having a "freely settled" bulk density of 476 g/L were obtained.

Figure 8:
FIG. 8 is a secondary electron image by SEM of particles of an anode active material obtained in Working Example 6.

The obtained particles were placed on a quartz boat and fired in a tubular furnace under a nitrogen gas stream, at the maximum temperature of 900° C. for an hour. Thus the composite particles having a "freely settled" bulk density of 641 g/L were obtained. Then, the fired material was passed through a mesh having an aperture of 45 μm and an anode active material having an average particle size (D50) of 17.6 μm and a "freely settled" bulk density of 629 g/L was obtained. FIG. 8 is an SEM image of the obtained anode active material particles. The particles contained substantially spherical particles, in which the anode active material particle graphite thin layers 12 were curled to cover the active material particles, as well as plate-like fine particles. The average circularity was 0.72 and the content of the plate-like fine particles was 1.1 wt %. The BET specific surface area determined by the BET method using nitrogen gas was 37 m$^2$/g.

Preparation of an Anode for a Lithium Ion Secondary Battery

A slurry containing an anode material mixture was prepared by mixing: 95.4 wt % of the anode active material obtained; 0.5 wt % of acetylene black as a conductivity aid; 1.5 wt % of carboxymethyl cellulose (CMC) and 2.6 wt % of styrene butadiene rubber (SBR) as binders; and water (all wt % were the contents per total solid content).

The slurry obtained was applied on a copper foil having a thickness of 18 μm (the coated amount as a solid content: 3.6 mg/cm$^2$) using an applicator. The coated material was dried in a vacuum dryer at 110° C. for 0.5 hours. After drying, the dried material was punched out to a circle of 14 mmφ in the diameter, pressed uniaxially at the pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 36 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1, added FEC (fluoroethylene carbonate) as an additive. To this, LiPF$_6$ was dissolved to the concentration of 1.2 mol/L, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Comparative Example 1

The same procedure to that in Example 2 was used during mixing, except that 36 g of the ultra fine particulate Si slurry, 18 g of the expanded graphite, 7.5 g of a resol-type phenol resin (weight average molecular weight (Mw): $3.6 \times 10^3$), and 2.4 L of ethanol were charged in a mixing container. Thus the conglobated particles having an average particle size (D50) of 4.2 μm and a "freely settled" bulk density of 250 g/L were obtained.

In the procedures similar to those in Example 2, an anode active material, an anode, and a cell for evaluation were prepared from this conglobated particles in this order and the cell was evaluated.

Figure 9:
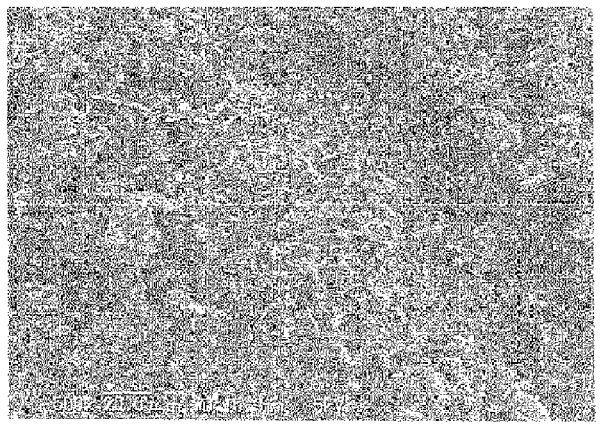
FIG. 9 is a secondary electron image by SEM of particles of an anode active material obtained in Comparative Example 1.

FIG. 9 is an SEM image of the obtained anode active material. The particles were not substantially spherical but fine particles and plate-like fine particles. The circularity of the particles was 0.65 and the content of the plate-like fine particles was 0.3 wt %. The BET specific surface area determined by the BET method using nitrogen gas was 33 $m^2/g$.

A lithium ion secondary battery using the anode active material obtained was prepared as follows.
Preparation of an Anode for a Lithium Ion Secondary Battery A slurry containing an anode material mixture was prepared by mixing: 90.8 wt % of the anode active material obtained; 0.5 wt % of acetylene black as a conductivity aid; 8.7 wt % of PVDF as a binder; and NMP (all wt % were the contents per total solid content).

The slurry obtained was applied on a copper foil having a thickness of 18 μm (the coated amount as a solid content: 2.2 mg/cm$^2$) using an applicator. The coated material was dried in a vacuum dryer at 110° C. for 0.5 hours. After drying, the dried material was punched out to a circle of 14 mmφ in the diameter, pressed uniaxially at the pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 17 μm thickness was obtained.
Preparation of a Cell for Evaluation The cell for evaluation was prepared as follows: in a screw-type cell, each of the anode described above, a separator (polypropylene, 24 mmφ), a glass filter (21 mmφ), and a metallic lithium (16 mmφ and thickness of 0.2 mm) and a stainless steel foil serving as a substrate thereof was dipped in an electrolyte and stacked in this order. The lid was screwed onto the cell. All procedures were done in a glove box. For the electrolyte, a mixed solvent of ethylene carbonate and diethyl carbonate at a volumetric ratio of 1:1 was used. The cell for evaluation was further placed in a sealed glass container with a silica gel. The electrodes penetrated through the silicone rubber lid were connected to a charge/discharge apparatus.
Evaluation Conditions The cell for evaluation was tested for cycle life test in the environmental chamber controlled to 25° C. The cell was charged to 0.01 V at a constant current of 1.4 mA and was charged at a constant voltage of 0.01 V until the current reached 0.2 mA. Also, the cell was discharged at a constant current of 1.4 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Comparative Example 2

A chemical-grade metallic Si (purity 3N) with an average particle size (D50) of 7 μm was mixed in ethanol at 23 wt %. The mixture was processed in a fine pulverizing wet beads mill using zirconia beads (0.3 mm diameter) for 6 hours and an ultra fine particulate Si slurry (an average particle size (D50): 0.3 μm, BET specific surface area when dried: 100 $m^2/g$) was obtained.

The acid-treated natural graphite (particle size (width in the (200) plane direction): 0.3 mm, thickness: 10 μm) was introduced in a vibrating powder feeder and fed into a mullite tube (length: 1 m, inner diameter: 20 mm) heated at 850° C. by an electric heater, using a nitrogen gas flow of 12 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.3 mm, which was the width of the original graphite, but its thickness was expanded to 2.4 mm, 240 times of the original graphite. The appearance of the expanded graphite was coil-shape, and SEM observation confirmed that the graphite layers were delaminated resulting in an accordion-shape.

102.6 g of the ultra fine particulate Si slurry, 48.0 g of the expanded graphite, 20.0 g of a resol-type phenol resin (weight average molecular weight (Mw): 370), and 5.9 L of ethanol were charged in a mixing container. The mixture was mixed and stirred for 90 minutes using a homo-mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 1 day. Thus 86 g of the dried mixture ("freely settled" bulk density: 66 g/L) was obtained.

The dried mixture was processed for granulation/compaction by passing through a three roll mill twice and sifted through a sieve with a 1 mm aperture to produce particles of 287 g/L of "freely settled" bulk density. Then the particles were subjected to thermal treatment at 150° C. for 2 hours.

Next, this thermally treated particles after granulation/compaction process were introduced into a new power mill and pulverized at 21000 rpm for 300 seconds while being water-cooled and processed for conglobation simultaneously. Thus, the conglobated particles having a "freely settled" bulk density of 225 g/L were obtained. The obtained particles were placed on a quartz boat and fired in a tubular furnace under a nitrogen gas stream, at the maximum temperature of 900° C. for an hour. Then, the particles were sifted through a mesh (aperture: 45 μm) and composite particles were obtained.

Figure 10:
FIG. 10 is a secondary electron image by SEM of particles of an anode active material obtained in Comparative Example 2.

The composite particles were introduced into the air classifier (ATP-50, manufactured by Hosokawa Micron Group) and classified at a classifier rotational rate of 18000 rpm and an air flow volume of 1.6 m³/min. The fine particles were collected by a cyclone collector and the anode active material having an average particle size (D50) of 4.3 μm and "freely settled" bulk density of 270 g/L was obtained. FIG. 10 is an SEM image of the obtained anode active material particles. The particles contained substantially spherical particles, in which the anode active material particle graphite thin layers 12 were curled to cover the active material particles, as well as plate-like fine particles. The average circularity was 0.56 and the content of the plate-like fine particles was 30.9 wt %. The BET specific surface area determined by the BET method using nitrogen gas was 47 m²/g.

Preparation of an Anode for a Lithium Ion Secondary Battery

A slurry containing an anode material mixture was prepared by mixing: 95.5 wt % of the anode active material obtained; 0.5 wt % of acetylene black as a conductivity aid; 1.5 wt % of carboxymethyl cellulose (CMC) and 2.5 wt % of styrene butadiene rubber (SBR) as binders; and water (all wt % were the contents per total solid content).

The slurry obtained was applied on a copper foil having a thickness of 18 μm (the coated amount as a solid content: 3.1 mg/cm²) using an applicator. The coated material was dried in a vacuum dryer at 110° C. for 0.5 hours. After drying, the dried material was punched out to a circle of 14 mmφ in the diameter, pressed uniaxially at the pressure of 0.6 t/cm². Furthermore, the pressed material was subjected to a thermal treatment at 110° C. for 3 hours in vacuum. Thus an anode for a lithium ion secondary battery formed with an anode material mixture layer of 28 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1, added FEC (fluoroethylene carbonate) as an additive. To this, $LiPF_6$ was dissolved to the concentration of 1.2 vol/L, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

The cell for evaluation was tested for cycle life test in the environmental chamber controlled to 25° C. The cell was charged to 0.01 V at a constant current of 2.2 mA and was charged at a constant voltage of 0.01 V until the current reached 0.2 mA. Also, the cell was discharged at a constant current of 2.2 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 30 cycles of charge-discharge test against the discharge capacity at the first cycle under the charge-discharge conditions described above.

Comparative Example 3

Figure 11:
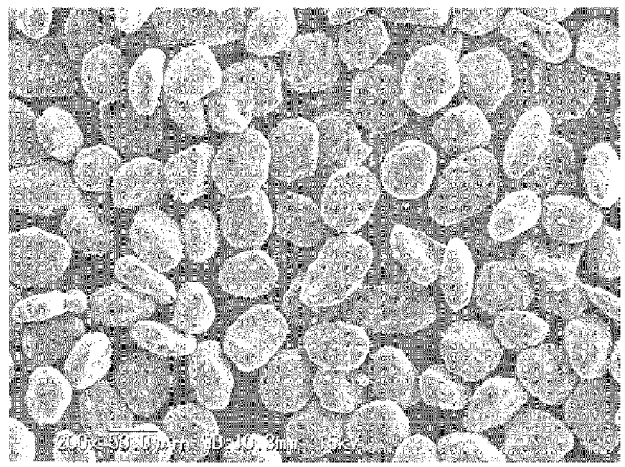
FIG. 11 is a secondary electron image by SEM of particles of an anode active material obtained in Comparative Example 3.

The particles of 45 μm or greater obtained by sifting the fired material through a mesh (aperture: 45 μm) in Example 3 was passed through a mesh having an aperture of 53 μm and composite particles having an average particle size (D50) of 54.8 μm and a "freely settled" bulk density of 935 g/L were obtained. FIG. 11 is an SEM image of the obtained anode active material particles. The particles were substantially spherical particles, in which the anode active material particle graphite thin layers 12 were curled to cover the active material particles. The average circularity was 0.73 and the content of the plate-like fine particles was 0 wt %. The BET specific surface area determined by the BET method using nitrogen gas was 92 m²/g.

The results of Examples 1 to 6 and the results of Comparative Examples 1 to 3 are shown in Table 1.

TABLE 1

| | Average particle size (D50) (μm) | "Freely settled" bulk density (g/L) | Average circularity | BET specific surface area (m²/g) | Plate-like particle content (%) | Initial discharge capacity (mAh/g) | Initial charge-discharge efficiency (%) | Cycle capacity retention rate (%) |
|---|---|---|---|---|---|---|---|---|
| Example 1 | 19.0 | 761 | 0.74 | 50 | 0 | 986 | 81 | 54 |
| Example 2 | 9.0 | 567 | 0.77 | 47 | 0 | 923 | 79 | 45 |
| Example 3 | 4.8 | 204 | 0.75 | 56 | 77.9 | 838 | 73 | 99 |
| Example 4 | 5.9 | 293 | 0.74 | 30 | 1.8 | 861 | 81 | 94 |
| Example 5 | 10.0 | 558 | 0.70 | 29 | 1.2 | 835 | 84 | 93 |
| Example 6 | 17.6 | 629 | 0.72 | 37 | 1.1 | 785 | 85 | 95 |
| Comparative Example 1 | 4.2 | 250 | 0.65 | 33 | 0.3 | 955 | 80 | 18 |
| Comparative Example 2 | 4.3 | 270 | 0.56 | 47 | 30.9 | 729 | 76 | 50 |
| Comparative Example 3 | 54.8 | 935 | 0.73 | 92 | 0 | — | — | — |

As evident from Table 1, the lithium ion secondary batteries of Examples 1 to 2 had high capacities, high initial charge-discharge efficiencies and excellent charge-discharge cycle characteristics.

The lithium ion secondary batteries of Examples 3 to 6, using anode active materials including plate-like fine particles in not less than 1% and not greater than 80%, exhibited even better charge-discharge cycle characteristics compared to Examples 1 and 2. For Examples 5 and 6, the initial charge-discharge efficiencies were still higher because the high-purity graphite was used as their raw materials.

In comparison, the lithium ion secondary battery of Comparative Example 1 exhibited the cycle retention rate lower than those of Examples 1 to 6, due to its low average circularity. The lithium ion secondary battery of Comparative Example 2 exhibited the poorer charge-discharge cycle characteristics, due to its low average circularity even though it contained appropriate amount of the plate-like fine particles, compared to those of Examples 3 to 5, which contained certain amounts of the same plate-like fine particles. In Comparative Example 3, the particle size of the composite particles was too large to form an electrode, making the evaluation impossible.

Example 7

A chemical-grade metallic Si (purity 3.5N) with an average particle size (D50) of 7 µm was mixed in methanol at 20 wt %. The mixture was processed in a fine pulverizing wet beads mill using zirconia beads (0.3 mm diameter) for 5 hours, and processed in an ultra fine pulverizing wet beads mill using zirconia beads (0.03 mm diameter) for 5 hours. A fine particulate Si slurry (an average particle size (D50): 0.16 µm, D90: 0.29 µm, measured by the laser diffraction particle distribution analyzer LA-950 manufactured by Horiba Ltd. with a real part of refractive index of 3.5 and an imaginary part of refractive index of 0; BET specific surface area when dried: 101 m$^2$/g, measured by TRISTAR 3000, BET specific surface area analyzer manufactured by Shimadzu Corp.) was obtained.

A natural graphite having a particle size (the width in the (200) plane direction) of 0.5 mm and a thickness of 0.02 mm was immersed in a solution (sodium nitrate 1 wt %, and potassium permanganate 7 wt % added in concentrated sulfuric acid) for 24 hours, then washed in water and dried. Thus, the acid-treated graphite was obtained. The acid-treated graphite was introduced in a vibrating powder feeder and fed into a mullite tube (length: 1 m, inner diameter: 11 mm) heated at 850° C. by an electric heater, using a nitrogen gas flow of 10 L/min as a carrier. Then the acid-treated graphite was discharged into atmosphere from the other end of the tube, gases such as sulfurous acid were exhausted to the upper part while an expanded graphite was collected in a stainless container at the lower part. The expanded graphite retained the width in the (200) plane direction as 0.5 mm, which was the width of the original graphite, but its thickness was expanded to 4 mm, 200 times of the original graphite. The appearance of the expanded graphite was coil-shape, and SEM observation confirmed that the graphite layers were delaminated resulting in an accordion-shape.

60 g of the ultra fine particulate Si slurry, 24 g of the expanded graphite, 10 g of a resol-type phenol resin (weight average molecular weight (Mw): 3.7×10$^2$), and 1 L of ethanol were charged in a mixing container to make the Si concentration 30 wt %. The mixture was mixed and stirred for an hour using a homo-mixer. Then, the mixture was transferred to a rotary evaporator, rotated and heated in a warm bath heated at 60° C., depressurized to a vacuum by an aspirator. Thus the solvent was removed. Subsequently, the mixture was spread on a tray and dried in a draft chamber while ventilated for 2 hours. Then the dried mixture was passed through a mesh (2 mm aperture) and dried for another 12 hours. Thus 40 g of the dried mixture ("freely settled" bulk density: 80 g/L) was obtained.

The dried mixture was processed for granulation/compaction by passing through a three roll mill twice to produce particles of 2 mm in size and 440 g/L of "freely settled" bulk density.

Next, these particles after granulation/compaction process were introduced into a new power mill and pulverized at 22000 rpm for 900 seconds while being water-cooled and processed for conglobation simultaneously. Thus, the conglobated particles having a "freely settled" bulk density of 650 g/L were obtained. The obtained particles were placed on an aluminum boat and fired in a tubular furnace under a nitrogen gas stream, at the maximum temperature of 900° C. for an hour. Then, the fired material was passed through a mesh having an aperture of 45 µm and an anode active material having an average particle size (D50) of 20 µm and a "freely settled" bulk density of 810 g/L was obtained.

Figure 12:
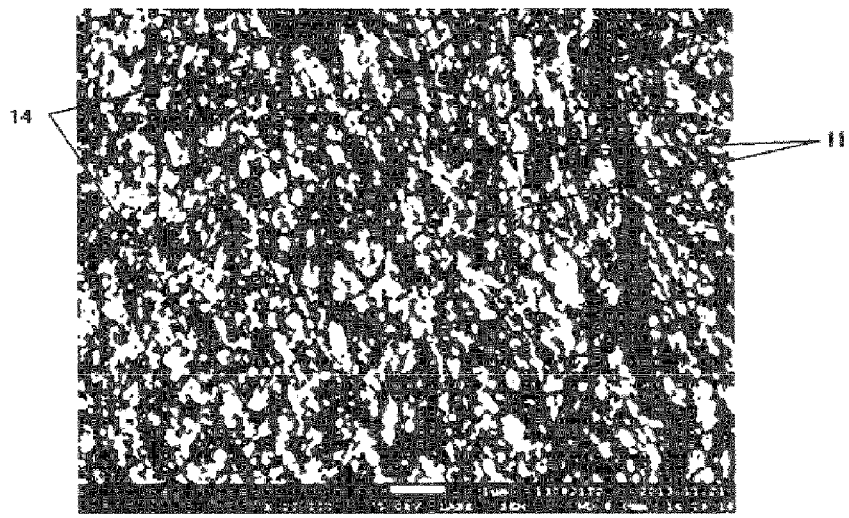
FIG. 12 is a secondary electron image by FE-SEM of the cross-section of particles of an anode active material obtained in Working Example 7.

FIG. 12 is a secondary electron image by FE-SEM of the cross-section of particles of an anode active material. The cross-section was prepared by an ion beam. Inside the anode active material particles, a structure in which the Si fine particles (0.05 to 0.2 µm in length) together with a carbonaceous material was interposed between graphite thin layers 11 (0.02 to 0.2 µm in thickness), was spread in mesh-like patterns and stacked. The spacing 12 between the graphite layers was 0.05 to 1 µm. The carbonaceous material covered the Si fine particles closely. Also, the graphite thin layer 11 was curled near the surface of an active material particle to cover the active material particle. The BET specific surface area determined by the BET method using nitrogen gas was 53 m$^2$/g. In the powder X-ray diffraction measured by the X-ray diffractometer RINT2000 manufactured by Rigaku Corp., the diffraction peak corresponding to (002) plane of the graphite was observed and d002 was 0.336 nm. Also, a very broad diffraction peak originating from the amorphous carbon of the carbonaceous material was observed in the vicinity of the diffraction peak corresponding to (002) plane of the graphite. The diffraction peak corresponding to (100) plane of Si was observed and d002 was 0.314 nm.

Figure 13:
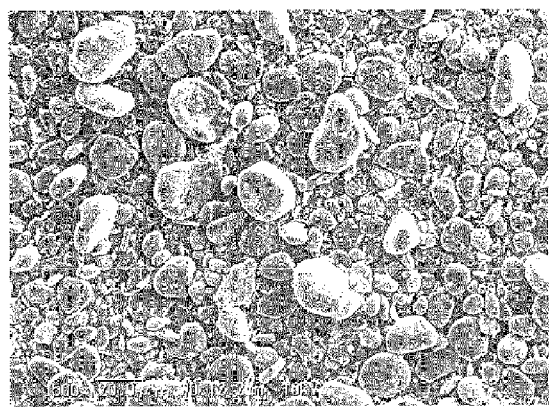
FIG. 13 is a secondary electron image by SEM of particles of an anode active material obtained in Working Example 8.

FIG. 13 is an SEM image of the obtained anode active material. The particles were substantially spherical particles, in which the anode active material particle graphite thin layers were curled to cover the active material particles. The average circularity was 0.73.

A lithium ion secondary battery using the anode active material obtained was prepared as follows.

Preparation of an Anode for a Lithium Ion Secondary Battery

A slurry containing an anode material mixture was prepared by mixing: 95.5 wt % of the anode active material obtained; 0.5 wt % of acetylene black as a conductivity aid; 1.5 wt % of carboxymethyl cellulose (CMC) and 2.5 wt % of styrene butadiene rubber (SBR) as binders; and water (all wt % were the contents per total solid content).

The slurry obtained was applied on a copper foil having a thickness of 15 µm (the coated amount as a solid content: 3 mg/cm$^2$) using an applicator. The coated material was dried in a stationary drier at 110° C. for 0.5 hours. After drying, the dried material was punched out to a circle of 14 mmφ in the diameter, pressed uniaxially at a pressure of 0.6 t/cm$^2$. Furthermore, the pressed material was subjected to a thermal treatment at 110° C. for 3 hours in vacuum. Thus an anode for a lithium ion secondary battery formed with an anode material mixture layer of 30 µm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (18 mmφ and thickness of 0.2 mm) and a stainless steel foil serving as a substrate thereof was dipped in an electrolyte and stacked in this order. The lid was screwed onto the cell. All procedures were done in a glove box. The electrolyte was a solvent mixture of ethylene carbonate and diethyl carbonate at a volumetric ratio of 1:1. To this, LiPF$_6$ was dissolved to the concentration of 1.2 mol/L and FEC (fluoroethylene carbonate) as an additive was added to 2 volumetric %, thus the electrolyte was prepared. The cell for evaluation was further placed in a sealed glass container with a silica gel. The electrodes penetrated through the silicone rubber lid were connected to a charge/discharge apparatus (SM-8, manufactured by Hokuto Denko Corp.).

Evaluation Conditions

The cell for evaluation was tested for cycle life test in the environmental chamber controlled to 25° C. The cell was charged to 0.01 V at a constant current of 2 mA and was charged at a constant voltage of 0.01 V until the current reached 0.2 mA. Also, the cell was discharged at a constant current of 2 mA until the voltage reached 1.5 V. The initial discharge capacity and initial charge-discharge efficiency were the results of the charge-discharge test during the first cycle.

Also, the cycle characteristic was evaluated as a capacity retention ratio, which was the comparison of the discharge capacity after 50 cycles of charge-discharge test against the discharge capacity at the first cycle under the charge-discharge conditions described above. The thicknesses before the charge-discharge cycles and after the 50 cycles of charge-discharge were evaluated as an expansion ratio.

Example 8

A chemical-grade metallic Si (purity 3.5N) with an average particle size (D50) of 7 μm, in pulverization of Si, was mixed in methanol at 20 wt %. The mixture was processed in a fine pulverizing wet beads mill using zirconia beads (0.3 mm diameter) for 5 hours only and a Si slurry (an average particle size (D50): 0.33 μm, D90: 0.52 μm, BET specific surface area when dried: 60 $m^2/g$) was obtained. Other than this change, an anode active material, an anode, and a cell for evaluation were prepared in this order in the similar procedures in Example 6. The anode active material had an average particle size (D50) of 19 μm, a BET specific surface area of 50 $m^2/g$ and an average circularity of 0.74. The cell for this anode active material was evaluated.

Example 9

The expanded graphite prepared by the thermal treatment similar to Example 6 of the acid-treated graphite (EXP-80MT manufactured by Nippon Graphite Group) as a graphite was used. The expanded graphite was expanded by 40 times. The appearance of the expanded graphite was coil-shape, and SEM observation confirmed that the graphite layers were delaminated resulting in an accordion-shape.

The impurity amounts in the expanded graphite determined by ICP semi-quantitative analysis were: Al 23 ppm, Ca 29 ppm, Fe 53 ppm, Mg 21 ppm, Na 25 ppm, and other elements less than 10 ppm. The purity was 99.9 wt %. The S content determined by the Oxygen-flask Method was less than 0.1 wt % and the BET specific surface area was 24 $m^2/g$.

144 g of the Si slurry similar to that of Example 8, 133 g of the expanded graphite, 27 g of a resol-type phenol resin similar to that of Example 7, and 2 L of ethanol were charged in a mixing container to make the Si concentration 20 wt %. The procedures similar to that of Example 7 were performed for mixing, granulation/compaction, pulverizing, conglobation and firing. The obtained particles were sifted through a mesh (aperture: 45 μm), thus the anode active material having an average particle size (D50) of 19 μm, a BET specific surface area of 50 $m^2/g$, an average circularity of 0.70 and a "freely settled" bulk density of 630 g/L was obtained. In the procedures similar to those in Example 7, an anode active material, an anode, and a cell for evaluation were prepared from this anode active material in this order and the cell was evaluated.

Example 10

144 g of the Si slurry similar to that of Example 8, 133 g of the expanded graphite similar to that of Example 7, 27 g of a resol-type phenol resin similar to that of Example 7, and 2 L of ethanol were charged in a mixing container to make the Si concentration 50 wt %. The procedures similar to that of Example 7 were performed for mixing, granulation/compaction, pulverizing, conglobation and firing. The obtained particles were sifted through a mesh (aperture: 45 μm), thus the anode active material having the average particle size (D50) of 7 μm, the BET specific surface area of 86 $m^2/g$, and the average circularity of 0.72 was obtained. In the procedures similar to those in Example 7, an anode active material, an anode, and a cell for evaluation were prepared from this anode active material in this order and the cell was evaluated.

Comparative Example 4

The same procedure to that in Example 8 was used during mixing, except that 36 g of the ultra fine particulate Si slurry similar to that of Example 7, 18 g of the expanded graphite, 7.5 g of a resol-type phenol resin (weight average molecular weight (Mw): $3.6 \times 10^3$), and 2.4 L of ethanol were charged in a mixing container to the Si concentration of 30 wt %. Thus the conglobated particles having a "freely settled" bulk density of 250 g/L were obtained.

In the procedures similar to those in Examples 7 and 8, an anode active material, an anode, and a cell for evaluation were prepared from these conglobated particles in this order and the cell was evaluated.

The anode active material was not substantially spherical but became fine particles and plate-like particles. D50 was 4 μm, the BET specific surface area was 33 $m^2/g$, and the average circularity was 0.65.

A lithium ion secondary battery using the anode active material obtained was prepared as follows.

Preparation of an Anode for a Lithium Ion Secondary Battery

A slurry containing an anode material mixture was prepared by mixing: 90.8 wt % of the anode active material obtained; 0.5 wt % of acetylene black as a conductivity aid; 8.7 wt % of PVDF as a binder; and NMP (all wt % were the contents per total solid content).

The slurry obtained was applied on a copper foil having a thickness of 18 μm (the coated amount as a solid content: 2.2 mg/$cm^2$) using an applicator. The coated material was dried in a vacuum dryer at 110° C. for 0.5 hours. After drying, the dried material was punched out to a circle of 14 mmφ in the diameter, pressed uniaxially at a pressure of 0.6 t/$cm^2$. Furthermore, the pressed material was subjected to a thermal treatment at 110° C. for 3 hours in vacuum. Thus an anode for a lithium ion secondary battery formed with an anode material mixture layer of 17 μm thickness was obtained.

Preparation of a Cell for Evaluation

The cell for evaluation was prepared as follows: in a screw-type cell, each of the anode described above, a separator (polypropylene, 24 mmφ), a glass filter (21 mmφ), and a metallic lithium (16 mmφ and thickness of 0.2 mm)

and a stainless steel foil serving as a substrate thereof was dipped in an electrolyte and stacked in this order. The lid was screwed onto the cell. All procedures were done in a glove box. For the electrolyte, a mixed solvent of ethylene carbonate and diethyl carbonate at a volumetric ratio of 1:1 was used. The cell for evaluation was further placed in a sealed glass container with a silica gel. The electrodes penetrated through the silicone rubber lid were connected to a charge/discharge apparatus.

Evaluation Conditions

The cell for evaluation was tested for cycle life test in the environmental chamber controlled to 25° C. The cell was charged to 0.01 V at a constant current of 1.4 mA and was charged at a constant voltage of 0.01 V until the current reached 0.2 mA. Also, the cell was discharged at a constant current of 1.4 mA until the voltage reached 1.5 V. The initial discharge capacity and initial charge-discharge efficiency were the results of the charge-discharge test during the first cycle.

Also, the cycle characteristics were evaluated as a capacity retention ratio, which was the comparison of the discharge capacity after 50 cycles of charge-discharge test against the discharge capacity at the first cycle under the charge-discharge conditions described above. The thicknesses before the charge-discharge cycles and after the 50 cycles of charge-discharge were evaluated as an expansion ratio.

Comparative Example 5

A chemical-grade metallic Si (purity 3.5N) with an average particle size (D50) of 7 µm, in pulverization of Si, was mixed in methanol at 20 wt %. The mixture was processed in a fine pulverizing wet beads mill using zirconia beads (0.3 mm diameter) for an hour only and a Si slurry (an average particle size (D50): 0.93 µm, D90: 3.92 µm, BET specific surface area: 15 m$^2$/g) was obtained. 180 g of the Si slurry, 133 g of the expanded graphite similar to that of Example 7, 27 g of a resol-type phenol resin, and 2 L of ethanol were charged in a mixing container to make the Si concentration 20 wt %. The procedures similar to that of Example 7 were performed for mixing, granulation/compaction, pulverizing, conglobation and firing. The obtained particles were sifted through a mesh (aperture: 45 µm), thus the anode active material having the average particle size (D50) of 10 µm, the BET specific surface area of 37 m$^2$/g, the average circularity of 0.72 and the "freely settled" bulk density of 588 g/L was obtained. In the procedures similar to those in Example 7, an anode active material, an anode, and a cell for evaluation were prepared from this anode active material in this order and the cell was evaluated.

The results of Examples 7 to 10 and the results of Comparative Examples 4 and 5 are shown in Table 2.

As evident from Table 2, the lithium ion secondary batteries of Examples 7 to 10, made of substantially spherical particles having the small average particle sizes (D50) and D90, the large BET specific surface areas and the average circularities of 0.7 to 1.0, had high initial discharge capacities of 785 to 1447 mAh/g, high initial charge-discharge efficiencies of 77 to 85%, superior cycle capacity retention rates of 70 to 90% and excellent expansion ratios.

In comparison, the lithium ion secondary battery of Comparative Example 4, made of the material having the average circularity less than 0.7 exhibited an initial discharge capacity of 1188 mAh/g and an initial charge-discharge efficiency of 80%, substantially similar to those of Examples 7 to 10, but the cycle capacity retention rate was poor at 12%. The lithium ion secondary battery of Comparative Example 2, made of the material having a small BET specific surface area of 15 m$^2$/g, exhibited an initial discharge capacity of 839 mAh/g and an initial charge-discharge efficiency of 86%, substantially similar to those of Examples 7 to 9, but the cycle capacity retention rate was poor at 61%.

TABLE 2

| | Pulverized Si raw material | | | Phenol resin raw material | Anode active material | | | | | | | |
|---|---|---|---|---|---|---|---|---|---|---|---|---|
| | Average particle size D50 (µm) | D90 (µm) | BET specific surface area (m$^2$/g) | Weight average molecular weight Mw | Si charged amount (wt %) | Average particle size D50 (µm) | BET specific surface area (m$^2$/g) | Average circularity | Initial discharge capacity (mAh/g) | Initial charge-discharge efficiency (%) | Cycle capacity retention rate (%) | Expansion ratio (%) |
| Example 7 | 0.10 | 0.29 | 101 | 3.7 × 10$^2$ | 30 | 20 | 53 | 0.73 | 909 | 77 | 77 | 270 |
| Example 8 | 0.33 | 0.52 | 60 | 3.7 × 10$^2$ | 30 | 19 | 50 | 0.74 | 1090 | 82 | 67 | 310 |
| Example 9 | 0.33 | 0.52 | 60 | 3.7 × 10$^2$ | 20 | 19 | 50 | 0.70 | 785 | 85 | 89 | 200 |
| Example 10 | 0.33 | 0.52 | 60 | 3.7 × 10$^2$ | 50 | 7 | 86 | 0.72 | 1447 | 82 | — | 239 |
| Comparative Example 4 | 0.16 | 0.29 | 101 | 3.6 × 10$^3$ | 30 | 4 | 33 | 0.65 | 1188 | 80 | 12 | — |
| Comparative Example 5 | 0.93 | 3.92 | 15 | 3.7 × 10$^2$ | 20 | 10 | 37 | 0.72 | 839 | 86 | 61 | 190 |

INDUSTRIAL APPLICABILITY

An anode active material for a lithium ion secondary battery and the production method thereof the present invention can be utilized for a lithium ion secondary battery for which the high capacity and long life are necessary.

REFERENCE SIGNS LIST

11 Graphite thin layer inside the anode active material
12 Graphite thin layer near the surface of the anode active material
13 Si fine particle and the layer of the carbonaceous material
14 Si fine particle inside the anode active material The present invention has been described in detail with reference to specific embodiments, but, it is obvious for a person skilled in the art that various changes and modifications are possible without departing from the intention and the scope of the present invention.

It should be noted that the present patent application is based on Japanese Patent Application 2014-096158 (date of application: May 7, 2014), Japanese Patent Application 2014-243869 (date of application: Dec. 2, 2014), Japanese Patent Application 2014-061376 (date of application: Mar. 25, 2014) and Japanese Patent Application 2014-247751 (date of application: Dec. 8, 2014), and these are herein incorporated in their entireties as references. Also, the reference therein are all incorporated in its entirety.

The invention claimed is:

1. An anode active material for a lithium ion secondary battery comprising:
   Si or a Si alloy; and
   a carbonaceous material and graphite;
   the anode active material being a substantially spherical composite particle, having an average particle size (D50) of 1 to 40 μm, and an average circularity of 0.7 to 1.0, and including plate-like fine particles with a minor axis length shorter than 1 μm measured by SEM image observation in not less than 1 wt % and not greater than 80 wt %,
   wherein the anode active material has a structure in which the Si or the Si alloy together with the carbonaceous material is interposed between thin layers of graphite having a thickness of 0.2 μm or less, the structure spreads in layers and/or in mesh-like patterns, the thin layers of graphite are curled near a surface of an active material particle to cover the active material particle and a carbonaceous material covers an outermost surface of the active material particle.

2. The anode active material for a lithium ion secondary battery according to claim 1, wherein an average particle size (D50) of the Si or the Si alloy is 0.01 to 5 μm and the carbonaceous material covers at least a surface of the active material.

3. The anode active material for a lithium ion secondary battery according to claim 1, wherein an average particle size (D50) of the Si or the Si alloy is 0.01 to 1 μm and the carbonaceous material covers at least a surface of the active material.

4. The anode active material for a lithium ion secondary battery according to claim 1, wherein:
   a purity of the graphite determined by a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) using ICP atomic emission spectroscopy is 99.9 wt % or higher, or an amount of impurities is 1000 ppm or less;
   an S content determined by ion chromatography (IC) analysis with Oxygen-flask Method is 0.3 wt % or less; and/or
   a BET specific surface area is 40 m$^2$/g or smaller.

5. The anode active material for a lithium ion secondary battery according to claim 1, wherein an amount of the Si or the Si alloy is 10 to 80 wt % and an amount of the carbonaceous material is 90 to 20 wt %.

6. The anode active material for a lithium ion secondary battery according to claim 1, wherein an amount of the Si or the Si alloy is 10 to 60 wt %, an amount of the carbonaceous material is 5 to 40 wt %, and an amount of the graphite is 20 to 80 wt %.

7. The anode active material for a lithium ion secondary battery according to claim 1, wherein a BET specific surface area is 0.5 to 80 m$^2$/g.

8. A production method for an anode active material for a lithium ion secondary battery comprising:
   Si or a Si alloy; and
   a carbon precursor and graphite;
   the anode active material being a substantially spherical composite particle, having an average particle size (D50) of 1 to 40 μm, and an average circularity of 0.7 to 1.0, and including plate-like fine particles with a minor axis length shorter than 1 μm measured by SEM image observation in not less than 1 wt % and not greater than 80 wt %,
   the method comprising the steps of:
   mixing Si or the Si alloy, the carbon precursor and graphite;
   performing granulation/compaction;
   performing pulverization and conglobation treatment to form a substantially spherical composite particle; and
   firing the composite particle in an inert gas atmosphere.

9. The production method for an anode active material for a lithium ion secondary battery according to claim 8, wherein a pulverized particle is re-bonded to form the substantially spherical composite particle in the conglobation treatment.

10. A production method for an anode active material for a lithium ion secondary battery comprising:
    Si or a Si alloy; and
    a carbon precursor and graphite;
    the anode active material being a substantially spherical composite particle, having an average particle size (D50) of 1 to 40 μm, and an average circularity of 0.7 to 1.0, and including plate-like fine particles with a minor axis length shorter than 1 μm measured by SEM image observation in not less than 1 wt % and not greater than 80 wt %,
    the method comprising the steps of:
    mixing Si or the Si alloy, the carbon precursor and graphite;
    performing granulation/compaction;
    performing pulverization and conglobation treatments to form a substantially spherical composite particle;
    firing the composite particle in an inert gas atmosphere; and
    dry classification utilizing air flow of a particle treated by pulverization and conglobation treatment or a fired particle.

11. The production method for an anode active material for a lithium ion secondary battery according to claim 10, wherein a pulverized particle is re-bonded to form the substantially spherical composite particle and a plate-like fine particle or the substantially spherical composite particle and a plate-like fine particle are mixed, agitated and classified in the conglobation treatment.

12. The production method for an anode active material for a lithium ion secondary battery according to claim 8, wherein the carbon precursor is a carbonaceous compound having a weight average molecular weight (Mw) of 1000 or less.

13. The production method for an anode active material for a lithium ion secondary battery according to claim 8, wherein the graphite is expanded graphite or flake graphite.

14. The production method for an anode active material for a lithium ion secondary battery according to claim 8, wherein a temperature of firing the composite particle in an inert gas atmosphere is 600 to 1200° C.

15. An anode active material for a lithium ion secondary battery comprising:
    10 to 80 wt % of Si or a Si alloy having an average particle size (D50) of 0.01 to 0.6 μm, D90 of 0.01 to 1.0 μm, and a BET specific surface area determined by BET method of 40 to 300 m$^2$/g;

90 to 5 wt % of a carbonaceous material; and
more than 0 to 80 wt % of graphite; and
the anode active material being substantially spherical with an average circularity of 0.7 to 1.0, and including plate-like fine particles with a minor axis length shorter than 1 µm measured by SEM image observation in not less than 1 wt % and not greater than 80 wt %,
wherein the anode active material has a structure in which the Si or the Si alloy together with the carbonaceous material is interposed between thin layers of graphite having a thickness of 0.2 µm or less, the structure spreads in layers and/or in mesh-like patterns, the thin layers of graphite are curled near a surface of an active material particle to cover the active material particle and a carbonaceous material covers an outermost surface of the active material particle.

16. The anode active material for a lithium ion secondary battery according to claim 15, wherein:
the Si or the Si alloy has an average particle size (D50) of 0.01 to 0.3 µm, D90 of 0.01 to 0.5 µm, and a BET specific surface area determined by BET method of 70 to 300 $m^2/g$.

17. The anode active material for a lithium ion secondary battery according to claim 15, wherein:
the anode active material has an average particle size (D50) of 1 to 40 µm, and a BET specific surface area determined by BET method of 5 to 120 $m^2/g$, and a surface of the anode active material is covered by the carbonaceous material.

18. The anode active material for a lithium ion secondary battery according to claim 15, wherein:
a purity of the graphite determined by a value of semi-quantitative impurity analysis for 26 elements (Al, Ca, Cr, Fe, K, Mg, Mn, Na, Ni, V, Zn, Zr, Ag, As, Ba, Be, Cd, Co, Cu, Mo, Pb, Sb, Se, Th, Tl, U) using ICP atomic emission spectroscopy is 99.9 wt % or higher, or an amount of impurities is 1000 ppm or less;
an S content determined by ion chromatography (IC) analysis with Oxygen-flask Method is 0.3 wt % or less; and/or
a BET specific surface area is 40 $m^2/g$ or smaller.

19. A production method for an anode active material for a lithium ion secondary battery comprising:
10 to 80 wt % of Si or a Si alloy having an average particle size (D50) of 0.01 to 0.6 µm, D90 of 0.01 to 1.0 µm, and a BET specific surface area determined by BET method of 40 to 300 $m^2/g$;
90 to 5 wt % of a carbonaceous material; and
0 to 80 wt % of graphite;
the anode active material being substantially spherical with an average circularity of 0.7 to 1.0, and including plate-like fine particles with a minor axis length shorter than 1 µm measured by SEM image observation in not less than 1 wt % and not greater than 80 wt %,
the method comprising the steps of:
mixing Si or the Si alloy, and the carbon precursor, and furthermore graphite as appropriate;
performing granulation/compaction;
performing pulverization and conglobation treatments to form a substantially spherical composite particle; and
firing the composite particle in an inert gas atmosphere.

20. The production method for an anode active material for a lithium ion secondary battery according to claim 19, wherein a temperature of firing the composite particle in an inert gas atmosphere is 600 to 1000° C.

* * * * *